(12) United States Patent
Sohn et al.

(10) Patent No.: US 10,585,456 B2
(45) Date of Patent: Mar. 10, 2020

(54) FLEXIBLE DISPLAY DEVICE HAVING BENDING SENSING DEVICE

(71) Applicant: LG Display Co., Ltd., Seoul (KR)

(72) Inventors: Min-Ho Sohn, Paju-si (KR); Sung-Jin Kang, Goyang-si (KR); Su-Jin Kwon, Seoul (KR); Yong-Kyun Choi, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 268 days.

(21) Appl. No.: 15/246,147

(22) Filed: Aug. 24, 2016

(65) Prior Publication Data

US 2017/0060189 A1  Mar. 2, 2017

(30) Foreign Application Priority Data

Aug. 26, 2015 (KR) .................. 10-2015-0119944
Nov. 30, 2015 (KR) .................. 10-2015-0169421

(51) Int. Cl.
| | |
|---|---|
| *G06F 1/16* | (2006.01) |
| *G09F 9/30* | (2006.01) |
| *G06F 3/0346* | (2013.01) |
| *G01L 1/22* | (2006.01) |
| *G06F 3/01* | (2006.01) |

(52) U.S. Cl.
CPC .......... *G06F 1/1652* (2013.01); *G01L 1/2206* (2013.01); *G06F 1/1684* (2013.01); *G06F 1/1694* (2013.01); *G06F 3/017* (2013.01); *G06F 3/0346* (2013.01); *G09F 9/301* (2013.01); *G09G 2380/02* (2013.01)

(58) Field of Classification Search
None
See application file for complete search history.

(56) References Cited

U.S. PATENT DOCUMENTS

| | | | |
|---|---|---|---|
| 2011/0001706 A1* | 1/2011 | Sanford | ................ G06F 3/0412 345/173 |
| 2011/0095974 A1* | 4/2011 | Moriwaki | .............. G09G 3/007 345/156 |
| 2013/0100053 A1* | 4/2013 | Kang | ........................ G06F 3/03 345/173 |

(Continued)

FOREIGN PATENT DOCUMENTS

| | | |
|---|---|---|
| CN | 1469100 A | 1/2004 |
| CN | 1533607 A | 9/2004 |

(Continued)

*Primary Examiner* — Parul H Gupta
(74) *Attorney, Agent, or Firm* — Seed Intellectual Property Law Group LLP

(57) ABSTRACT

Disclosed herein is a flexible display device having a bending sensing device configured such that an external resistor is mounted in the flexible display device together with a bending sensor, whereby it is possible to lower an output offset voltage, to reduce resistance deviation depending on temperature change, and to sense twisting of the flexible display device. The bending sensing device includes at least one bending sensor mounted in a bending region of a film (layer) that is tensioned and/or a film (layer) that is compressed when the flexible display device, including a plurality of films (layers), is bent and at least one reference resistor mounted in a non-bending region of the film (layer) that is tensioned and/or the film (layer) that is compressed.

19 Claims, 17 Drawing Sheets

(56) References Cited

U.S. PATENT DOCUMENTS

2013/0265221 A1* 10/2013 Lee ........................ G06F 3/01
　　　　　　　　　　　　　　　　　　　　　　345/156
2015/0296607 A1* 10/2015 Yang ..................... G01L 1/205
　　　　　　　　　　　　　　　　　　　　　　361/750

FOREIGN PATENT DOCUMENTS

| CN | 102054399 A | 5/2011 |
| CN | 102629446 A | 8/2012 |
| CN | 103247235 A | 8/2013 |
| CN | 103365594 A | 10/2013 |
| CN | 103926774 A | 7/2014 |
| EP | 1 384 612 A2 | 1/2004 |
| GB | 2 388 709 A | 11/2003 |
| KR | 10-2014-0085906 A | 7/2014 |
| KR | 10-2015-0029395 A | 3/2015 |

* cited by examiner

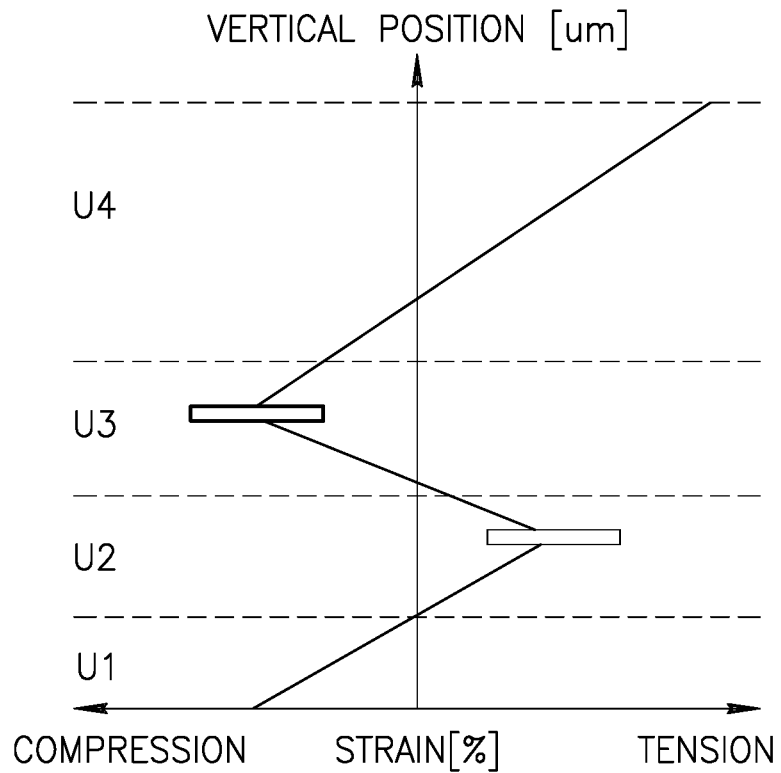
FIG. 8B
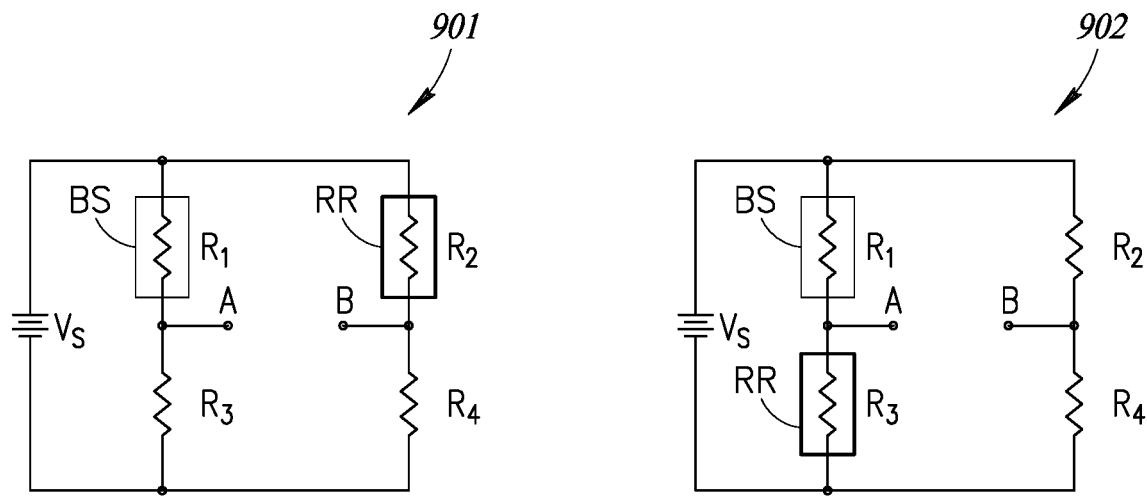
FIG. 9A
FIG. 9B

FLEXIBLE DISPLAY DEVICE HAVING BENDING SENSING DEVICE

CROSS-REFERENCE TO RELATED APPLICATIONS

This application claims the benefit of Korean Patent Application No. 10-2015-0119944, filed on Aug. 26, 2015, and Korean Patent Application No. 10-2015-0169421, filed on Nov. 30, 2015, which are hereby incorporated by reference as if fully set forth herein.

BACKGROUND

Technical Field

The present invention relates to a flexible display device, and more particularly to a flexible display device having a bending sensing device configured such that an external resistor is mounted in the flexible display device together with a bending sensor, whereby it is possible to lower an output offset voltage, to reduce resistance deviation depending on temperature change, and to sense twisting of the flexible display device.

Description of the Related Art

Display technology for processing and displaying a large amount of information has rapidly grown. In addition, various kinds of display devices have been developed.

Examples of display devices include a liquid crystal display (LCD) device, a plasma display panel (PDP) device, a field emission display (FED) device, and an electroluminescent display (ELD) device. The thickness, weight, and power consumption of the display devices have been continuously reduced. However, it is difficult to manufacture the above-mentioned display devices such that the display devices are thin and flexible, since the display devices use a glass substrate, which withstands high temperatures generated in a manufacturing process.

For this reason, a flexible display device manufactured using a flexible material, such as a plastic film, which is foldable or unfoldable, in place of the conventional glass substrate, which has no flexibility, such that the flexible display device can be curved like paper while maintaining display performance has attracted attention as a next-generation flat panel display device in recent years. The flexible display device has advantages in that the flexible display device is thin, lightweight, impact resistance, and can be curved or bent so as to be folded or rolled for carrying. In addition, the flexible display device may be manufactured to have various forms. Consequently, future applicability of the flexible display device may be extended.

Flexible display devices have completed the testing phase, and mass-production of flexible display devices is imminent. It is expected that the flexible display device provides a new input and output interface different from electronic devices having conventional rigid displays, and it is also expected that newer user experiences may be provided through the new input and output interface.

In recent years, a device for sensing the shape of the flexible display device, configured such that a plurality of bending sensors is disposed at the edge of the flexible display device in order to sense the shape of the flexible display device, has been proposed (see Korean Patent Application Publication No. 10-2014-0132569).

FIG. 1 is a view showing a conventional flexible display device in which a plurality of bending sensors is disposed, and FIG. 2 is a view showing the construction of a conventional measurement unit. FIGS. 3A and 3B are views showing strain gauge circuits, and FIG. 4 is a block diagram showing the detailed construction of a microprocessor (MCU) of FIG. 2.

Referring to FIG. 1, bending sensors 101 and 102 for sensing bending of a flexible display device 100 are arranged along the edge of the flexible display device 100 at predetermined intervals.

Each of the bending sensors 101 and 102 may be a strain gauge. The strain gauge has a characteristic in that the resistance between terminals varies depending on physical tension (elongation) and compression (contraction). In order to sense the shape of the flexible display device 100 using the sensors, it is necessary to provide a measurement unit for signal processing. The measurement unit may be realized as shown in FIG. 2.

The conventional measurement unit may include a bridge circuit 210, an amplifier 220, and an analog to digital converter (ADC) 230.

The bridge circuit 210 is realized by a Wheatstone bridge, which includes one or more strain gauges. Since the resistance variation of each of the strain gauges is very small, the Wheatstone bridge is configured, as shown in FIG. 2, in order to convert resistance variation into voltage variation, which is amplified by the amplifier 220.

Meanwhile, the Wheatstone bridge may use a quarter-bridge circuit for sensing variation of a single strain gauge, as shown in FIG. 3A, or a half-bridge circuit for sensing variation of a pair of strain gauges, one of which is tensioned and the other of which is compressed, as shown in FIG. 3B. That is, in the case in which strain gauges are mounted to opposite surfaces of the flexible display device 100 at the positions at which the bending sensors 101 and 102 are disposed, the strain gauges may sense tensile strain and compressive strain. Consequently, the sensitivities of the sensors are improved.

Meanwhile, in the case in which the bridge circuit 210 of FIG. 2 is configured as a quarter-bridge circuit 320a shown in FIG. 3A, the quarter-bridge circuit 320a may be constituted by R1, R2, R3, and one strain gauge 330a. When power from a power source 310 is distributed to the respective resistors, the amplitude of voltage output from the bridge circuit varies depending on the resistance variation of the strain gauge 330a.

On the other hand, in the case in which the bridge circuit 210 of FIG. 2 is configured as a half-bridge circuit 320b shown in FIG. 3B, the half-bridge circuit 320b may be constituted by R1, R3, and two strain gauges 330b and 330c. When power from a power source 310 is distributed to the respective resistors, the amplitude of voltage output from the bridge circuit varies depending on the resistance variations of the strain gauges 330b and 330c. The shape of the flexible display device is sensed based on the value of the voltage output from the bridge circuit.

The voltage output from the bridge circuit 210 is input to the amplifier 220, by which a small value of voltage is amplified into a large value of voltage. The amplified voltage is input to the analog to digital converter 230. The analog to digital converter 230 converts an analog signal into a digital signal, which is output to a microprocessor 240. The microprocessor (MCU) 240 determines the shape of the flexible display device 100 based on the values sensed by the sensors.

The detailed construction of the microprocessor 240 is shown in FIG. 4.

That is, the microprocessor 240 includes an input 401, a noise filter 402, a channel compensator 403, a curve point detector 404, a gain controller 405, a bending line detector 406, a slope compensator 407, and a feature extractor 408.

The input 401 receives the digital signal from the analog to digital converter 230. The noise filter 402 filters the change of a sensor value (e.g., provided at the input 401) due to factors other than the bending of the flexible display device 100 from a meaningful signal.

The channel compensator 403 compensates for the deviation between the sensors disposed at the flexible display device 100. In addition, the channel compensator 403 may compensate for the deviation between different sensors used in flexible display devices 100.

The curve point detector 404 analyzes values (for example, voltage values) sensed by the sensors 101 and 102 arranged in a line along each side (i.e. each edge) of the flexible display device 100 to extract the position and feature of a curve point formed at each edge (i.e. each outer region) of the flexible display device 100.

Upon determining based on the value output from the curve point detector 404 that the values output from the sensors 101 and 102 are less than a predetermined reference value or deviate from an input range of the analog to digital converter 230, and therefore it is necessary to control the gain of the amplifier 220 (for example, a variable gain amplifier), the gain controller 405 generates and provides an appropriate gain control signal to the amplifier 220.

Meanwhile, information about curve points detected from outer regions 110, 111, 112, and 113 by the curve point detector 404 is input to the bending line detector 406 in order to be used to determine the shape of the flexible display device 100.

The slope compensator 407 compensates for information about bending of bending lines based on information about slope of the bending lines.

The feature extractor 408 extracts and transmits the position, slope, angle, thickness, and direction of the detected bending lines to an upper layer.

However, the device and method for sensing the bending of the flexible display device have the following problems.

First, in the conventional flexible display device, the bending sensors are attached to the surface of the flexible display device. As a result, it is not possible to accurately sense overall deformation of the flexible display device. In addition, it is not possible to accurately measure stress and strain in layers of the flexible display device and to estimate deterioration of the flexible display device over time and depending on environments.

The reason for this is that the thickness of the conventional strain gauges is about 75 μm (in case of commercial products) and a special bonding agent having a thickness of several tens of μm in order to bond the strain gauges to the flexible display device 100 (e.g., to a surface of the flexible display device 100). In the case in which the thickness of the strain gauges is reduced like the flexible display device, the elasticity of the strain gauges, rather than the elasticity of the flexible display device 100, is critical, with the result that it is not possible to accurately sense the deformation of the flexible display device 100.

In addition, the special bonding agent, provided between the flexible display device 100 and the strain gauges, has a different coefficient of elasticity than the flexible display device 100 (e.g., a surface of the flexible display device 100). In addition, the special bonding agent has viscosity in addition to elasticity. Even when the flexible display device 100 is linearly deformed, therefore, the values measured by the strain gauges are not linear.

Second, in the case in which the bridge circuit is configured as the quarter-bridge circuit shown in FIG. 3A, the bending sensors (strain gauges) are disposed at the edge of the flexible display device, and the other resistors R1, R2, and R3 are formed in a circuit board. As a result, offset and tolerance are generated due to the difference in wiring length between the bending sensors (strain gauges) and the other resistors R1, R2, and R3.

If the signal is amplified in the state in which the offset value is present, the amplified signal exceeds the input margin of the analog to digital converter, with the result that the digitized value becomes saturated.

Third, in the case in which the bridge circuit is configured as the half-bridge circuit shown in FIG. 3B, two bending sensors (two strain gauges) must be in states of being tensioned and compressed. In this case, design of the system may be restricted.

Fourth, in the conventional flexible display device, the bending sensors are attached to the surface of the flexible display device. As a result, it is necessary to form a routing line for transmitting a signal output from each bending sensor through an additional process, or an additional flexible printed circuit (FPC) is required, whereby production costs are increased.

Fifth, in the conventional flexible display device, the bending region has higher flexibility than the remaining region, with the result that the flexible display device may be twisted. In the case in which the flexible display device is twisted, however, it may be incorrectly detected that the flexible display device is bent.

BRIEF SUMMARY

Accordingly, the present disclosure is directed to a flexible display device having a bending sensing device that substantially obviates one or more problems due to limitations and disadvantages of the related art.

In one or more embodiments, the present disclosure provides a flexible display device having a bending sensing device configured such that an external resistor is mounted in the flexible display device together with a bending sensor, whereby it is possible to lower an output offset voltage, to reduce resistance deviation depending on temperature change, and to sense twisting of the flexible display device.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the embodiments particularly pointed out in the written description and claims hereof as well as the appended drawings.

To achieve these objects and other advantages and in accordance with the purpose of the disclosure, as embodied and broadly described herein, a flexible display device having a bending sensing device includes at least one bending sensor mounted in a bending region of a layer that is tensioned and/or a layer that is compressed when the flexible display device, including a plurality of layers, is bent, and at least one reference resistor mounted in a non-bending region of the layer that is tensioned and/or the layer that is compressed.

One bending sensor may be mounted in the bending region of the layer that is compressed, and one reference resistor may be mounted in the non-bending region of the layer that is compressed. Alternatively, one bending sensor may be mounted in the bending region of the layer that is tensioned, and one reference resistor may be mounted in the non-bending region of the layer that is tensioned.

A signal detected by the one bending sensor may be output through a bridge circuit, the bridge circuit may include a first connection unit, in which R1 and R3 are coupled to each other in series via a first load, and a second connection unit, in which R2 and R4 are coupled to each other in series via a second load, disposed between opposite ends of a power source, the first connection unit and the second connection unit being coupled to each other in parallel, and output terminals being provided at the first load and the second load, wherein the one bending sensor may be constituted by one of R1 to R4, and the one reference resistor may be constituted by another of R1 to R4 adjacent to the one of R1 to R4.

The one bending sensor may be constituted by R1, and the one reference resistor may be constituted by R2 or R3, the one bending sensor may be constituted by R2, and the one reference resistor may be constituted by R1 or R4, the one bending sensor may be constituted by R3, and the one reference resistor may be constituted by R1 or R4, or the one bending sensor may be constituted by R4, and the one reference resistor may be constituted by R2 or R3.

In another example, a first bending sensor may be mounted in the bending region of the layer that is compressed, and a first reference resistor may be mounted in the non-bending region of the layer that is compressed. In addition, a second bending sensor may be mounted in the bending region of the layer that is tensioned, and a second reference resistor may be mounted in the non-bending region of the layer that is tensioned.

The first and second bending sensors may be mounted in one side of the bending region of the flexible display device. Alternatively, the first and second bending sensors may be mounted in opposite sides of the bending region of the flexible display device.

In the case in which the first and second bending sensors are mounted in the flexible display device, signals detected by the first and second bending sensors may be output through a bridge circuit, the bridge circuit may include a first connection unit, in which R1 and R3 are coupled to each other in series via a first load, and a second connection unit, in which R2 and R4 are coupled to each other in series via a second load, disposed between opposite ends of a power source, the first connection unit and the second connection unit being coupled to each other in parallel, and output terminals being provided at the first load and the second load, wherein the first and second bending sensors may be constituted by R1 and R2 respectively and the first and second reference resistors may be constituted by R3 and R4 respectively, the first and second bending sensors may be constituted by R1 and R3 respectively and the first and second reference resistors may be constituted by R2 and R4 respectively, the first and second bending sensors may be constituted by R3 and R4 respectively and the first and second reference resistors may be constituted by R1 and R2 respectively, or the first and second bending sensors may be constituted by R2 and R4 respectively and the first and second reference resistors may be constituted by R1 and R3 respectively.

In another example, two bending sensors may be mounted in the bending region of the layer that is compressed, and two reference resistors may be mounted in the non-bending region of the layer that is compressed, or two bending sensors may be mounted in the bending region of the layer that is tensioned, and two reference resistors may be mounted in the non-bending region of the layer that is tensioned.

In the case in which the two bending sensors are mounted in the flexible display device, signals detected by the two bending sensors may be output through a bridge circuit, the bridge circuit may include a first connection unit, in which R1 and R3 are coupled to each other in series via a first load, and a second connection unit, in which R2 and R4 are coupled to each other in series via a second load, disposed between opposite ends of a power source, the first connection unit and the second connection unit being coupled to each other in parallel, and output terminals being provided at the first load and the second load, wherein the two bending sensors may be constituted by R1 and R4 and the two reference resistors may be constituted by R2 and R3, or the two bending sensors may be constituted by R2 and R3 and the two reference resistors may be constituted by R1 and R4.

In another aspect of the present disclosure, a flexible display device having a bending sensing device includes at least one bending sensor mounted in a bending region of the flexible display device such that the at least one bending sensor is oblique to the flexible display device and at least one reference resistor mounted in a non-bending region of the flexible display device such that the at least one reference resistor is parallel or perpendicular to the flexible display device.

The at least one bending sensor may include a first bending sensor and a second bending sensor, the first bending sensor and the second bending sensor being mounted in one side of the bending region, and the at least one reference resistor may include a first reference resistor and a second reference resistor, the first reference resistor and the second reference resistor being mounted in one side of the non-bending region.

The at least one bending sensor may include a first bending sensor and a second bending sensor, the first bending sensor being mounted in one side of the bending region and the second bending sensor being mounted in the other side of the bending region, and the at least one reference resistor may include a first reference resistor and a second reference resistor, the first reference resistor being mounted in one side of the non-bending region and the second reference resistor being mounted in the other side of the non-bending region.

The first bending sensor and the second bending sensor may be mounted in the bending region such that the first bending sensor and the second bending sensor are oblique in opposite directions.

It is to be understood that both the foregoing general description and the following detailed description of the present disclosure are exemplary and explanatory and are intended to provide further explanation of the disclosure as claimed.

BRIEF DESCRIPTION OF THE SEVERAL
VIEWS OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIGS. 3A and 3B are views showing strain gauge circuits, wherein FIG. 3A is a view showing a quarter-bridge circuit, and FIG. 3B is a view showing a half-bridge circuit;

FIG. 8B is a plot illustrating the relationship between tension and compression in the layers of the flexible display device of FIG. 8A, according to embodiments of the present disclosure;

FIG. 9A is a view showing the construction of a first embodiment of a bridge circuit of a flexible display device having a bending sensing device according to a first embodiment of the present disclosure;

FIG. 9B is a view showing the construction of a second embodiment of the bridge circuit of the flexible display device having the bending sensing device according to the first embodiment of the present disclosure;

Figure 13A:
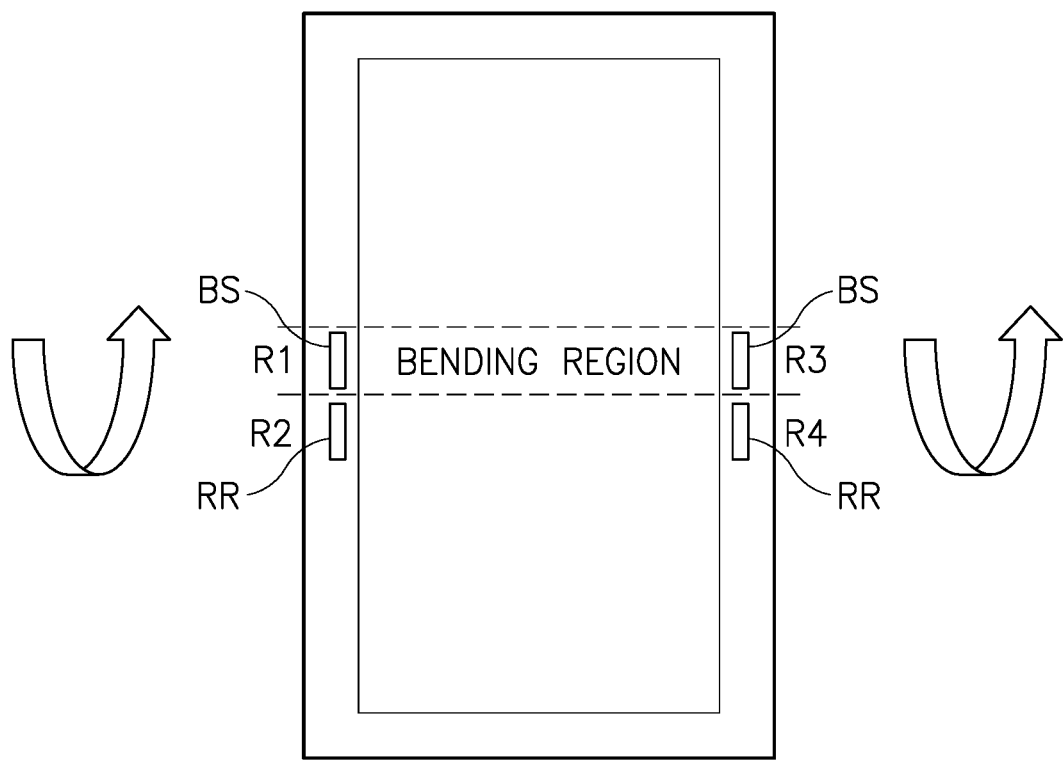
Figure 13B:
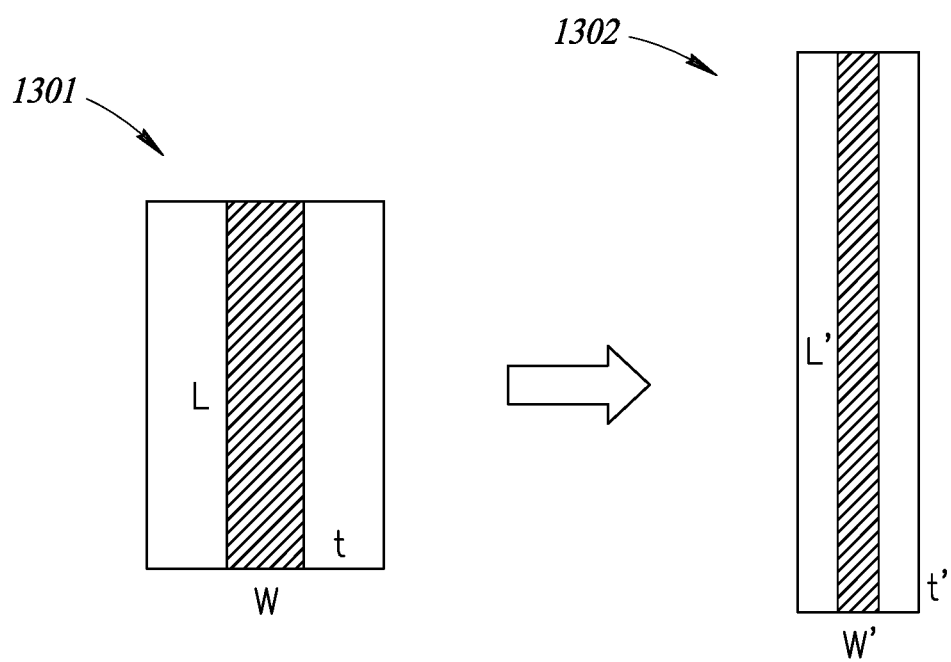
Figure 14A:
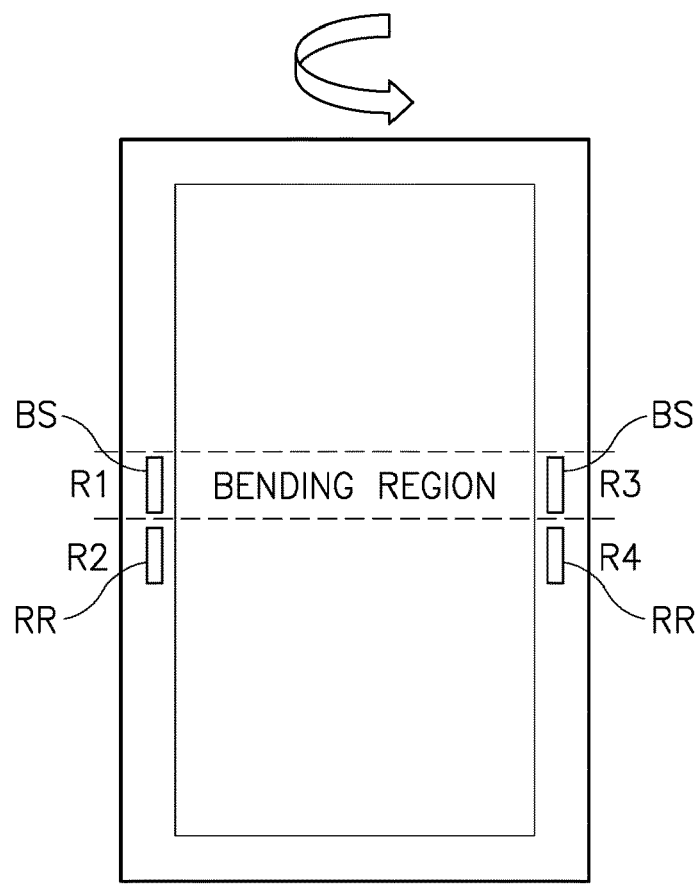
Figure 14B:
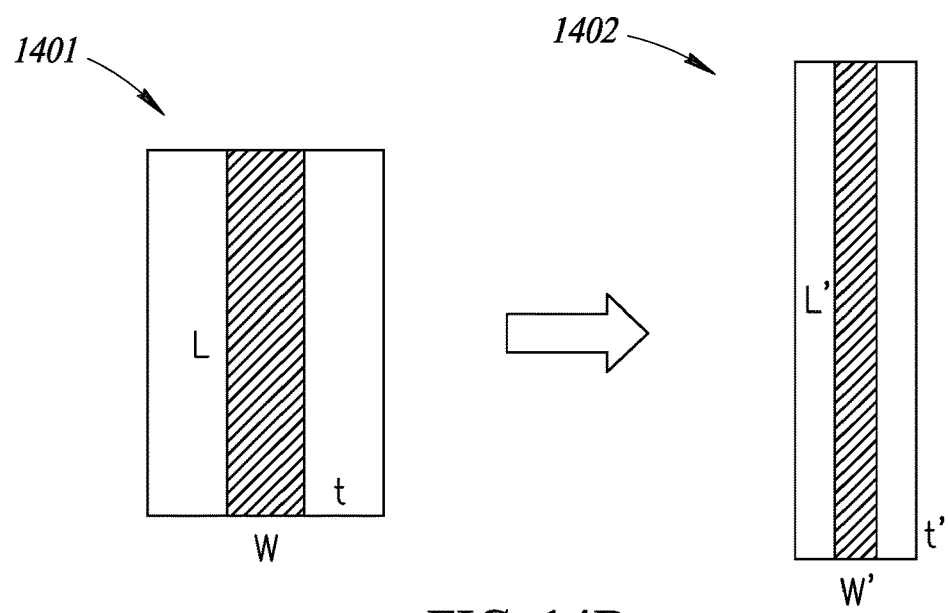
Figure 15A:
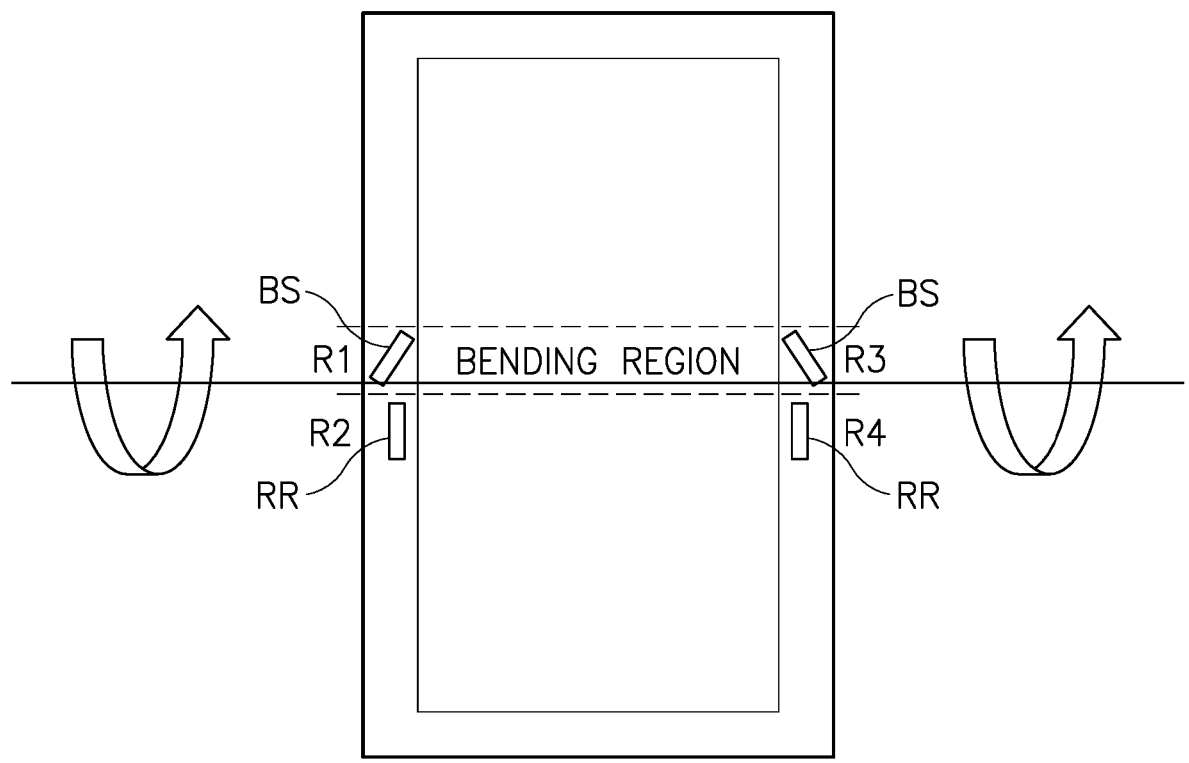
Figure 15B:
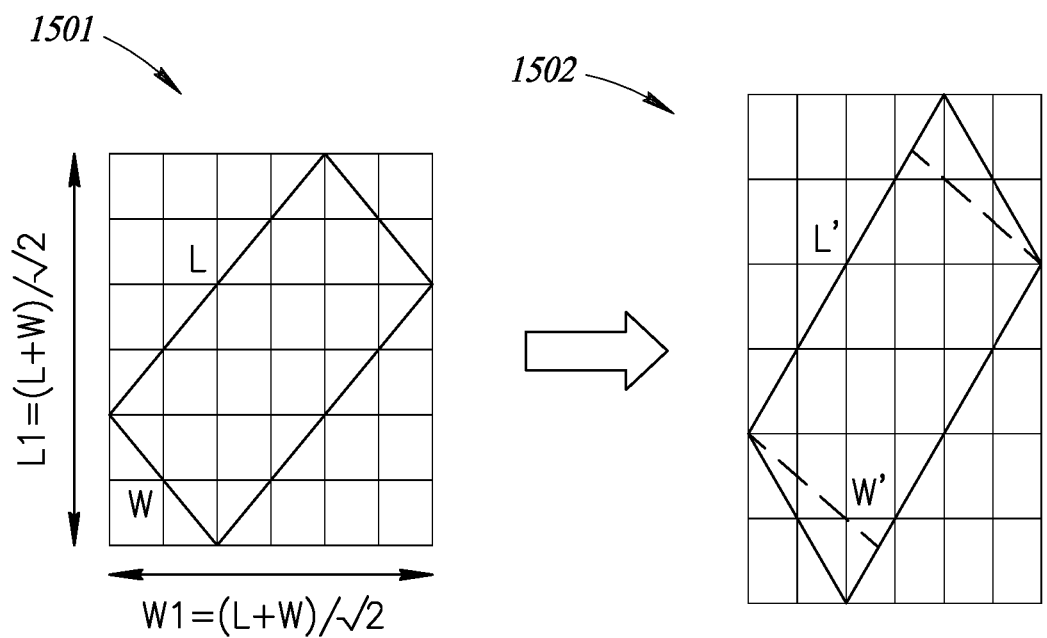
Figure 16A:
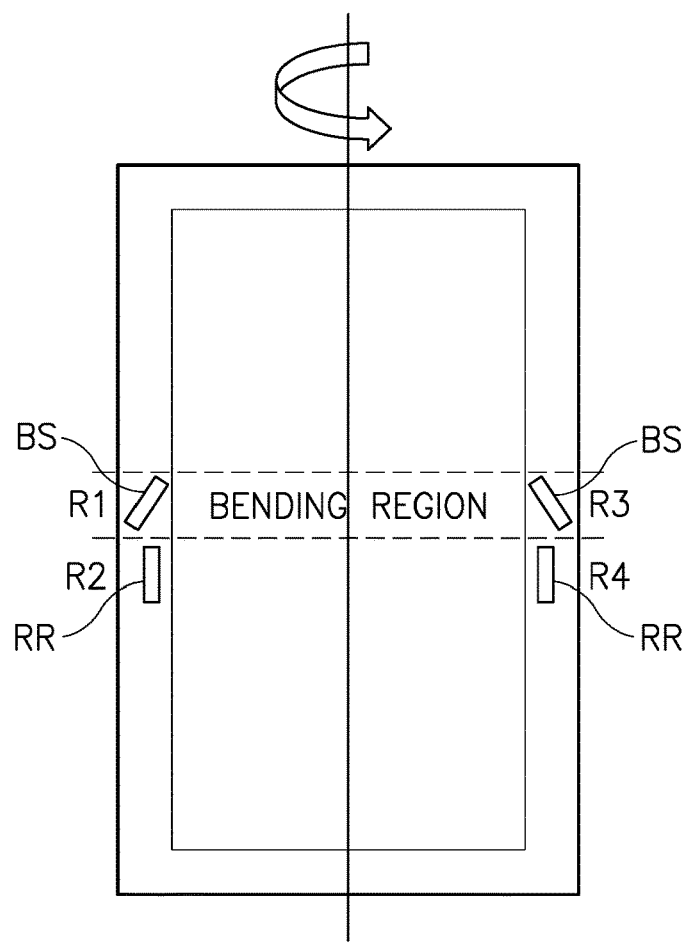
Figure 16B:
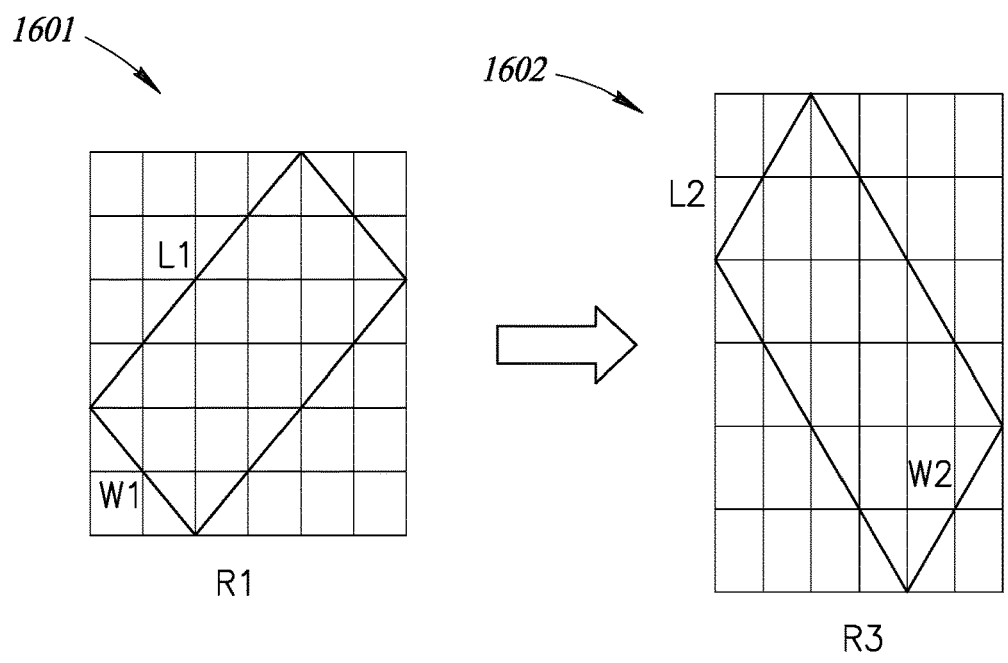
Figure 17:
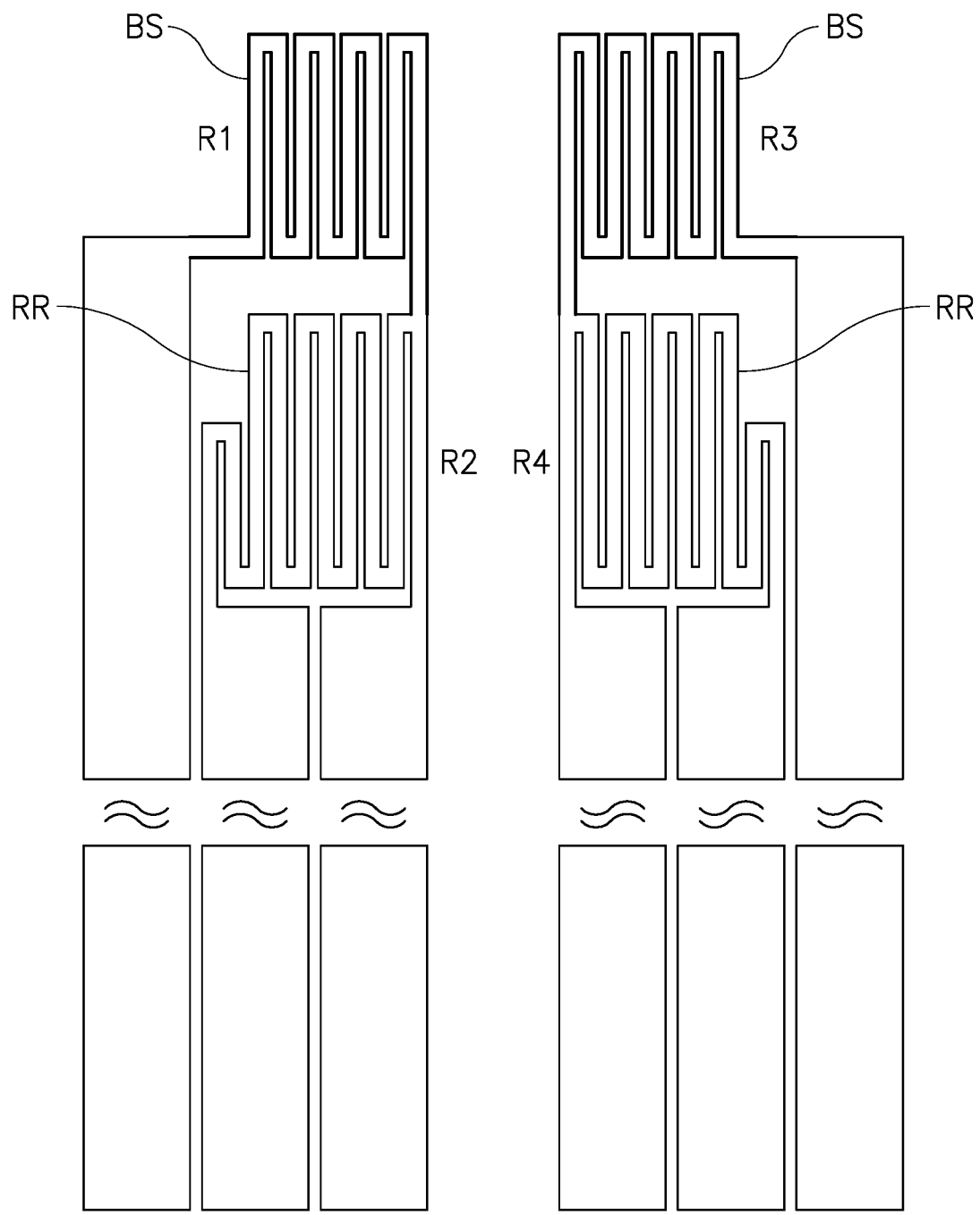
Figure 18:
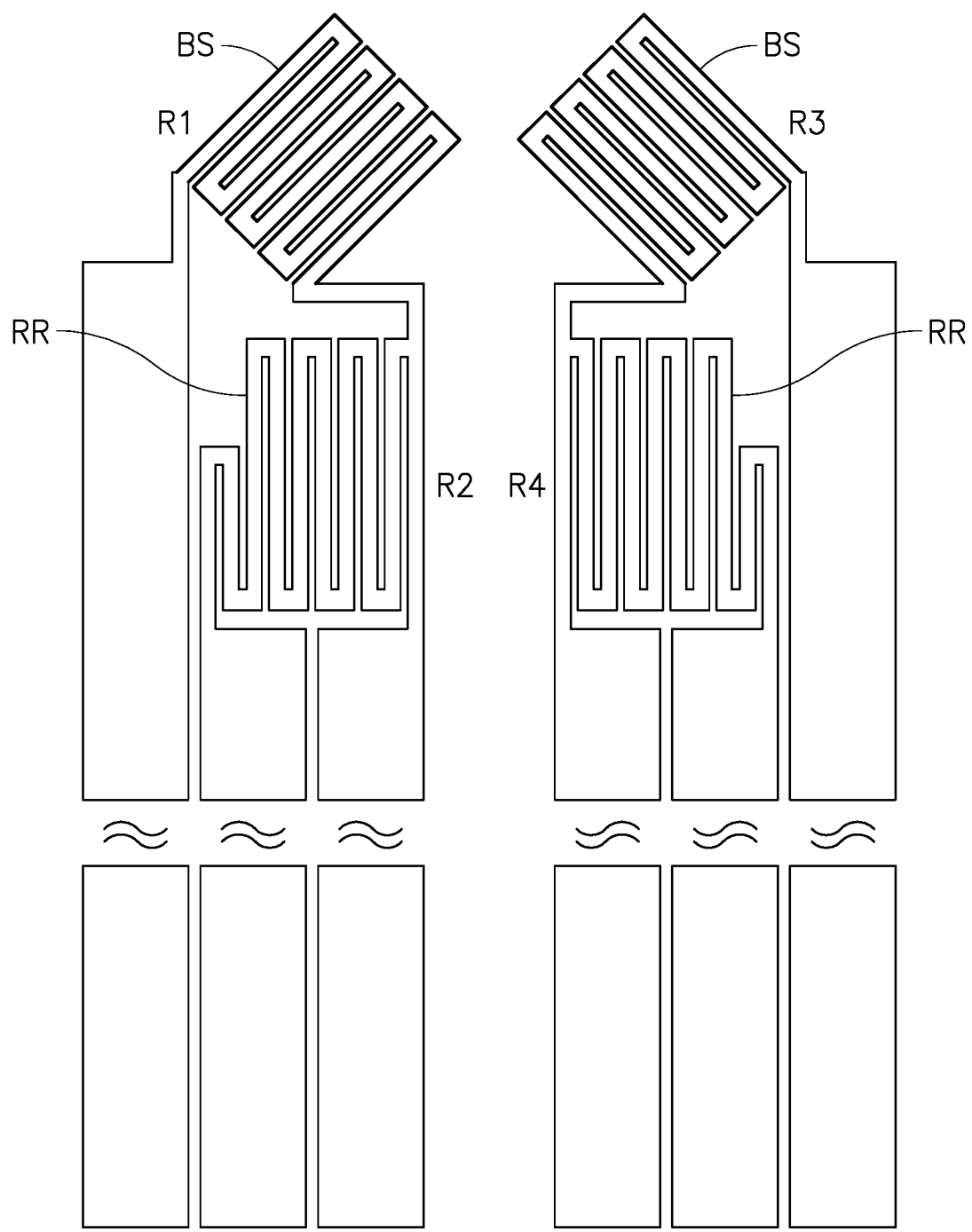

FIGS. 13A and 13B are views illustrating the case in which the bending region is normally bent at 90 degrees, wherein FIG. 13A is a view illustrating the flexible display device having the bending sensing device according to the second or third embodiment of the present disclosure, and FIG. 13B is a view showing the state of a bending sensor when the bending sensor is mounted in a point at which tensile strain is generated and a bending region is not bent and the state of the bending sensor when the bending sensor is mounted in the point at which tensile strain is generated and the bending region is normally bent;

FIGS. 14A and 14B are views illustrating the case in which the flexible display device is twisted, wherein FIG. 14A is a view illustrating the case in which the flexible display device having the bending sensing device according to the second or third embodiment of the present disclosure is twisted, and FIG. 14B is a view showing the state of a bending sensor when the bending sensor is mounted in a point at which tensile strain is generated and a bending region is not bent and the state of the bending sensor when the bending sensor is mounted in the point at which tensile strain is generated and the bending region is twisted;

FIGS. 15A and 15B are views illustrating the change in length and width of bending sensors according to a fourth embodiment of the present disclosure when the bending sensors are obliquely mounted in a bending region of a flexible display device and the bending region is normally bent, wherein FIG. 15A is a view illustrating the case in which the bending sensors are obliquely mounted in the bending region of the flexible display device, and FIG. 15B is a view showing the state of a bending sensor when the bending sensor is obliquely mounted in a bending region and the bending region is not bent and the state of the bending sensor when the bending sensor is obliquely mounted in the bending region and the bending region is not twisted but is normally bent;

FIGS. 16A and 16B are views illustrating the change in length and width of the bending sensors according to the fourth embodiment of the present disclosure when the bending sensors are obliquely mounted in the bending region of the flexible display device and the bending region is twisted, wherein FIG. 16A is a view illustrating the case in which the bending sensors are obliquely mounted in the bending region of the flexible display device, and FIG. 16B is a view showing the state of a first bending sensor R1 when the bending region is twisted in the direction in which the first bending sensor R1 is oblique and the state of a second bending sensor R3 when the bending region is twisted in the direction in which the first bending sensor R1 is oblique;

FIG. 17 is a plan view showing bending sensors and reference resistors mounted in the flexible display device having the bending sensing device according to the second or third embodiment of the present disclosure; and FIG. 18 is a plan view showing bending sensors and reference resistors mounted in the flexible display device having the bending sensing device according to the fourth embodiment of the present disclosure.

DETAILED DESCRIPTION

Reference will now be made in detail to the preferred embodiments of the present disclosure, examples of which are illustrated in the accompanying drawings.

Figure 5:
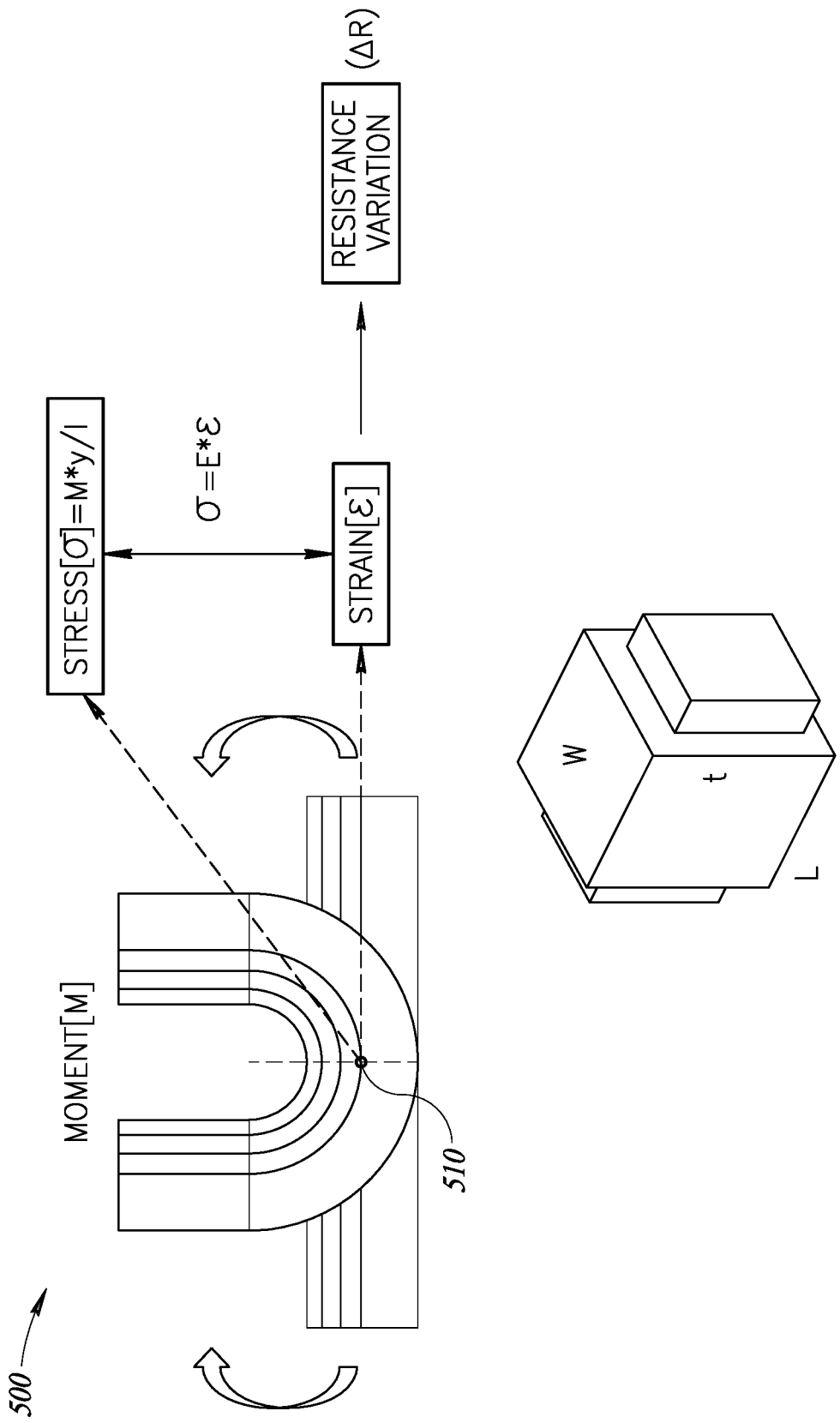
FIG. 5 is a view illustrating the principle of sensing bending of a flexible display device according to the present disclosure.
Figure 6:
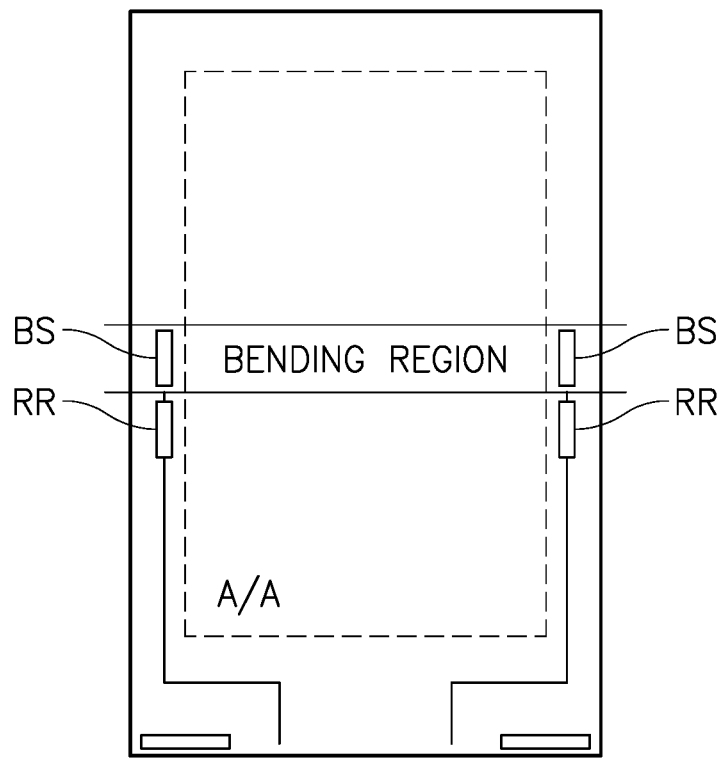
FIG. 6 is a view illustrating the case in which a bending sensor and a reference resistor are mounted in one side or each side of a bending region of the flexible display device according to the present disclosure.

FIG. 5 is a view illustrating the principle of sensing bending of a flexible display device according to the present disclosure, and FIG. 6 is a view illustrating the case in which a bending sensor is mounted in one side or each side of a bending region of the flexible display device according to the present disclosure. A sensor which senses bending of a device can be referred to as either a bend sensor or a bending sensor, both being used herein to have the same meaning.

As shown in FIG. 5, when the flexible display device 500 is bent, stress σ and strain ε are generated on a curve point 510 of the display device 500. The stress σ and the strain ε are proportional to each other, as shown by the following equations:

$$\text{Stress } [\sigma]=M*y/I;$$

$$\sigma=E*\varepsilon,$$

where: y=distance from neutral plane, I=Moment of Inertia, E=Young's modulus, and $v=(d\varepsilon_{trans}/d\varepsilon_{axial})=0.334$.

The resistance (R) of a material (e.g., a bending sensor in the flexible display device 500) at the curve point 510 varies as the flexible display device 500 is tensioned and/or compressed, according to the following equation: $R=(\rho/t)*(L/W)$, where ρ=resistivity, L=length, W=width and t=thickness.

When the flexible display device 500 is bent, the thickness t, the width w, and the length L of the curve point 510 are changed based on the strain ε.

When the flexible display device 500 is tensioned, the width w and the thickness t of the curve point 510 are decreased, and the length L of the curve point 510 is increased, whereby the resistance is increased. When the flexible display device 500 is compressed, the width w and the thickness t of the curve point 510 are increased, and the length L of the curve point 510 is decreased, whereby the resistance R is decreased.

In a flexible display device 600 having the bending sensing device according to one or more embodiments of the present disclosure, as shown in FIG. 6, two bending sensors BS are mounted in each side of a bending region of the flexible display device, and two reference resistors RR are mounted in each side of a non-bending region of the flexible display device.

Figure 7A:
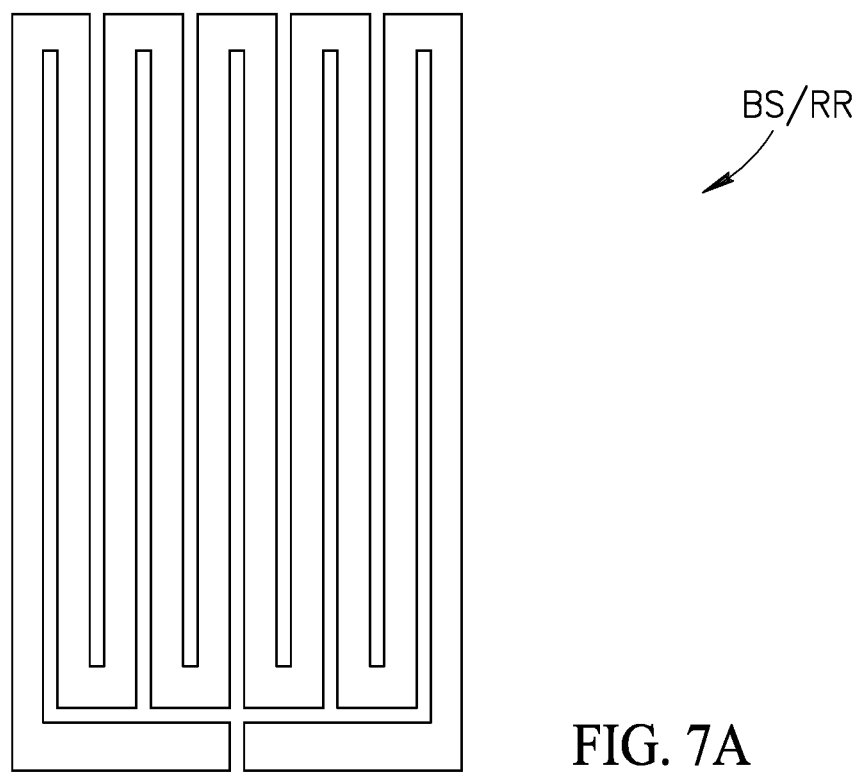
FIG. 7A is a view illustrating the bending sensor and the reference resistor mounted in the flexible display device according to the present disclosure.
Figure 7B:
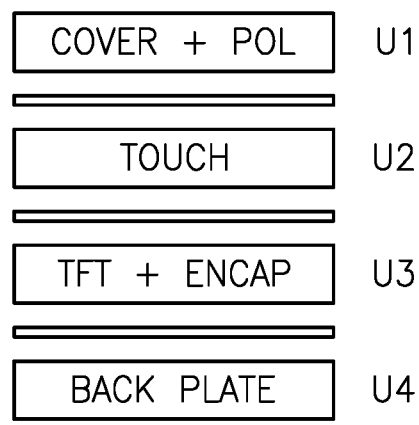
FIG. 7B is a view illustrating the positions at which the bending sensor and the reference resistor according to the present disclosure are mounted in the flexible display device.

FIG. 7A is a view illustrating the bending sensor BS and the reference resistor RR, which may be mounted in the flexible display device according to the present disclosure, and FIG. 7B is a view illustrating the positions at which the bending sensor BS and the reference resistor RR according to the present disclosure are mounted in the flexible display device.

As shown in FIG. 7A, the bending sensor BS and the reference resistor RR according to the present disclosure are each made of a conductive material having electrical resistance, and have the same shape. Consequently, the bending sensor BS and the reference resistor RR are formed so as to have the same resistance value. However, the resistance value of the bending sensor BS varies depending upon the bending extent (the bending angle), since the bending sensor BS is formed in the bending region, and the resistance value of the reference resistor RR does not vary, since the reference resistor RR is formed in the non-bending region. That is, the bending sensor BS and the reference resistor RR may be substantially the same, with the only difference being that the bending sensor BS is formed in the bending region, while the reference resistor RR is formed in a non-bending region.

In addition, as shown in FIG. 7B, the flexible display device according to embodiments of the present disclosure includes a plurality of films (layers U1 to U4), such as a back plate layer (Back plate U4), a pixel array layer (TFT+Encap U3), a touch sensor layer (Touch U2), and a cover plate layer (Cover+Pol U1).

Since the flexible display device includes a plurality of films as described above, some of the films (layers) in the bending region are tensioned, and some of the films (layers) in the bending region are compressed. Since some of the films (layers) in the bending region are tensioned, and some of the films (layers) in the bending region are compressed, as described above, the bending sensor BS and the reference resistor RR are mounted in at least one of the pixel array layer (TFT+Encap U3), the touch sensor layer (Touch U2), and the cover plate layer (Cover+Pol U1), shown in FIG. 7B.

The bending sensor BS and the reference resistor RR may be formed in different layers. Alternatively, the bending sensor BS and the reference resistor RR may be formed in the same layer since the bending sensor BS and the reference resistor RR have the same resistance value. In any case, however, the bending sensor BS is formed in the bending region, and the reference resistor RR is formed in the non-bending region.

Figure 8A:
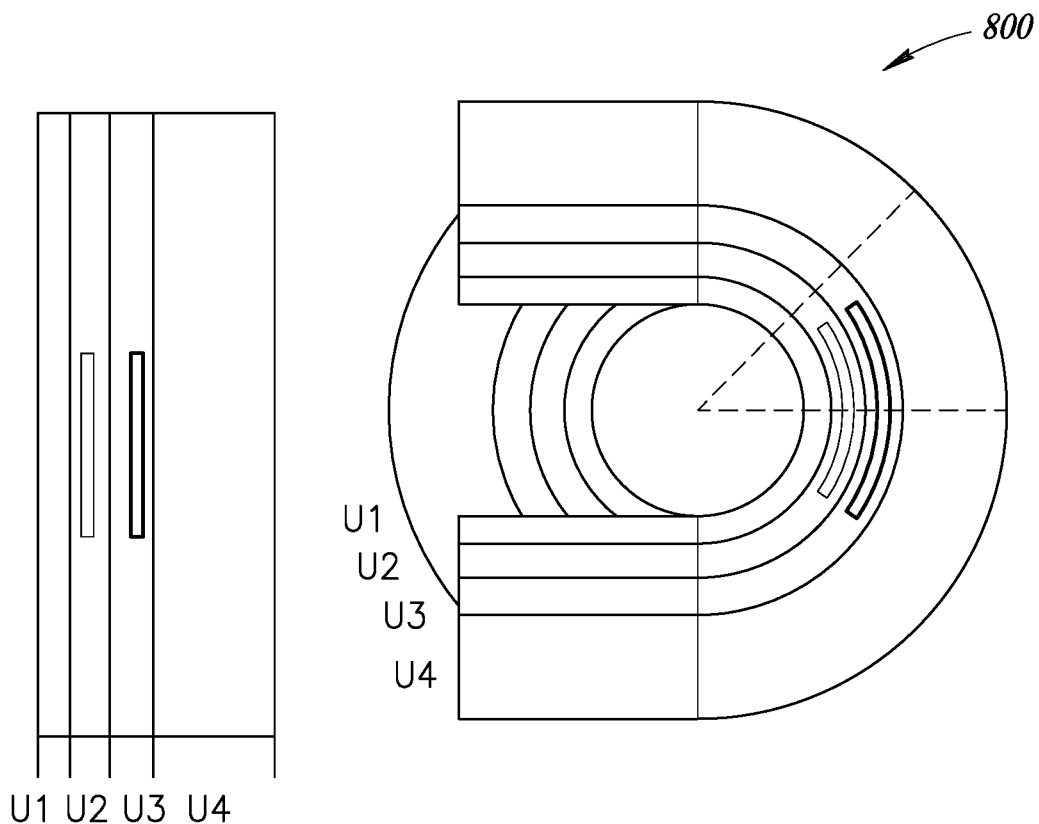
FIG. 8A is a view illustrating bending of the flexible display device in the bending region.

FIGS. 8A and 8B illustrate the relationship between tension and compression in the bending region of a flexible display device 800 according to one or more embodiments of the present disclosure, in which a bending sensor BS and a reference resistor RR are formed in one or both of the second film U2 and the third film U3.

As described above, the flexible display device 800 includes a plurality of films (layers). Specifically, the flexible display device 800 includes four films U1, U2, U3, and U4, as shown in FIG. 8A. When the flexible display device 800 is bent, therefore, the tensile strain depth and the compressive strain depth of the bending region in the depth direction differ from each other.

[Flexible Display Device Having Bending Sensing Device According to First Embodiment]

Referring to FIG. 8A, when the flexible display device 800 is bent toward the first film U1, the third film U3 is compressed, and the second film U2 is tensioned.

In the flexible display device 800 having the bending sensing device according to the first embodiment of the present disclosure, therefore, one bending sensor (strain gauge) BS is mounted in one side of the bending region shown in FIG. 6, and at least one reference resistor RR is mounted in one side of the non-bending region. In this case, the bending sensor BS and the reference resistor RR may be mounted in the third film U3, which is compressed, as described with reference to FIG. 8B, or may be mounted in the second film U2, which is tensioned, as described with reference to FIG. 8B.

FIG. 9A is a view showing a first embodiment of a bridge circuit 901 of the flexible display device 800 having the bending sensing device according to the first embodiment of the present disclosure, and FIG. 9B is a view showing a second embodiment of a bridge circuit 902 of the flexible display device 800 having the bending sensing device according to the first embodiment of the present disclosure.

In the flexible display device 800 having the bending sensing device according to the first embodiment of the present disclosure, the first embodiment of the bridge circuit 901 includes one bending sensor (strain gauge) R1 and three reference resistors R2, R3, and R4, as shown in FIG. 9A. The reference resistor R2 is mounted in the flexible display device in the same manner as the bending sensor. However, the present disclosure is not limited thereto. The reference resistors R3 and R4 may also be mounted in the flexible display device.

That is, as described with reference to FIG. 8, the bending sensor R1 is mounted in the bending region of the third film U3, which is compressed, or the second film U2, which is tensioned, and the reference resistor R2 is mounted in the non-bending region of the third film U3, which is compressed, or the second film U2, which is tensioned.

That is, a bridge circuit 901 including a first connection unit ("connection unit" may be referred to hereinafter as a "branch" of the bridge circuit), in which R1 and R3 are coupled to each other in series via a first load, and a second connection unit, in which R2 and R4 are coupled to each other in series via a second load, disposed between opposite ends of a power source (Vs), wherein the first connection unit and the second connection unit are coupled to each other in parallel, and output terminals A and B are formed at the first load and the second load, respectively, is characterized in that the bending sensor is constituted by R1, and the reference resistor, which is mounted in the non-bending region of the third film U3, which is compressed, or the second film U2, which is tensioned, is constituted by R2.

In the case in which the bridge circuit 901 is configured as shown in FIG. 9A, the voltage value $V_{AB}$ between the terminals A and B is as follows.

$$V_{AB}=[R3/(R1+R3)-R4/(R2+R4)]\times Vs \qquad \text{[Equation 1]}$$

R1 is a bending sensor for sensing tensile strain or compressive strain. When the flexible display device 800 is bent, therefore, the resistance of R1 varies. Since R2 is formed in the non-bending region, however, the resistance of R2 does not vary when the flexible display device 800 is bent. Since the bending sensor R1 and the reference resistor R2 are mounted in the flexible display device 800, the bending sensor R1 and the reference resistor R2 may have the same tolerance range. Furthermore, output offset voltage values may be lowered, and resistance deviation depending on temperature change may be reduced.

In addition, in the flexible display device 800 having the bending sensing device according to the first embodiment of the present disclosure, the second embodiment of the bridge circuit 902 includes one bending sensor (strain gauge) R1 and three reference resistors R2, R3, and R4, as shown in FIG. 9B. The reference resistor R3 is mounted in the flexible display device 800 in the same manner as the bending sensor. However, the present disclosure is not limited thereto. The reference resistors R2 and R4 may also be mounted the flexible display device.

That is, as described with reference to FIG. 8, the bending sensor R1 is mounted in the bending region of the third film U3, which is compressed, or the second film U2, which is tensioned, and the reference resistor R3 is mounted in the non-bending region of the third film U3, which is compressed, or the second film U2, which is tensioned.

That is, a bridge circuit 902 including a first connection unit, in which R1 and R3 are coupled to each other in series via a first load, and a second connection unit, in which R2 and R4 are coupled to each other in series via a second load, disposed between opposite ends of a power source (Vs), wherein the first connection unit and the second connection unit are coupled to each other in parallel, and output terminals A and B are formed at the first load and the second load, respectively, is characterized in that the bending sensor is constituted by R1, and the reference resistor, which is mounted in the non-bending region of the third film U3, which is compressed, or the second film U2, which is tensioned, is constituted by R3.

In the case in which the bridge circuit is configured as shown in FIG. 9B, the voltage value $V_{AB}$ between the terminals A and B is as represented in [Equation 1].

$$V_{AB}=[R3/(R1+R3)-R4/(R2+R4)]\times Vs$$

R1 is a bending sensor for sensing tensile strain or compressive strain. When the flexible display device is bent, therefore, the resistance of R1 varies. Since R3 is formed in the non-bending region, however, the resistance of R3 does not vary when the flexible display device is bent. Since the bending sensor R1 and the reference resistor R3 are mounted in the flexible display device, the bending sensor R1 and the reference resistor R3 may have the same tolerance range. Furthermore, output offset voltage values may be lowered, and resistance deviation depending on temperature change may be reduced.

Although not shown, in the first or second embodiment of the bridge circuit, the bending sensor may be constituted by R2, and the reference resistor may be constituted by R1 or R4. Alternatively, the bending sensor may be constituted by R3, and the reference resistor may be constituted by R1 or R2. Alternatively, the bending sensor may be constituted by R4, and the reference resistor may be constituted by R2 or R3.

That is, in the first or second embodiment of the bridge circuit, the bending sensor may be constituted by one of R1 to R4, and the reference resistor may be constituted by a resistor adjacent to the bending sensor.

[Flexible Display Device Having Bending Sensing Device According to Second Embodiment]

The flexible display device 800 having the bending sensing device according to the second embodiment is configured such that two bending sensors (strain gauges) are mounted in a bending region of one side of the flexible display device and two reference resistors are mounted in a non-bending region of one side of the flexible display device 800 or such that one bending sensor (strain gauge) is mounted in a bending region of each side of the flexible display device 800 and one reference resistor is mounted in a non-bending region of each side of the flexible display device 800.

In this case, one bending sensor is mounted in the third film U3, which is compressed, and the other bending sensor is mounted in the second film U2, which is tensioned, described with reference to FIG. 8.

Figure 10A:
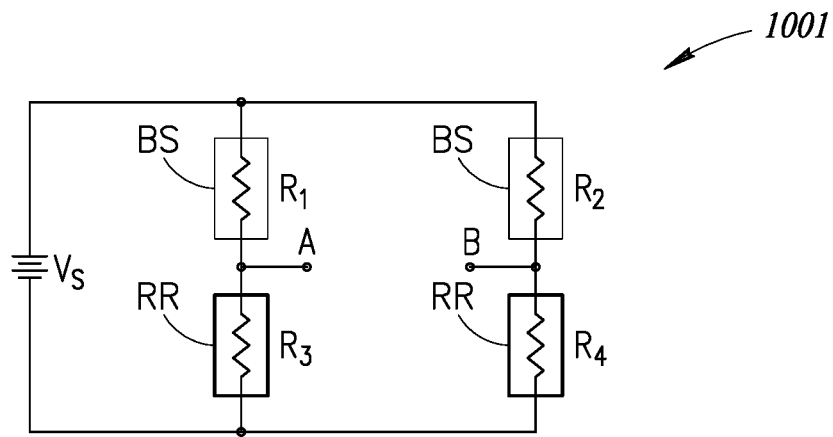
FIG. 10A is a view showing the construction of a third embodiment of a bridge circuit of a flexible display device having a bending sensing device according to a second embodiment of the present disclosure.
Figure 10B:
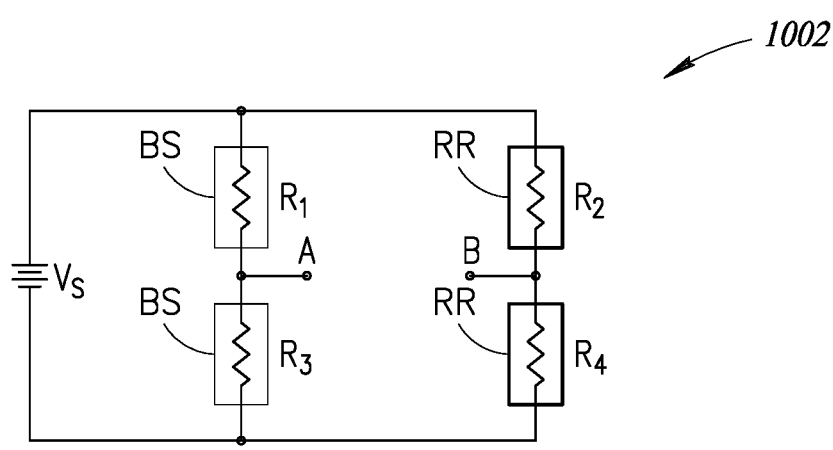
FIG. 10B is a view showing the construction of a fourth embodiment of the bridge circuit of the flexible display device having the bending sensing device according to the second embodiment of the present disclosure.
Figure 10C:
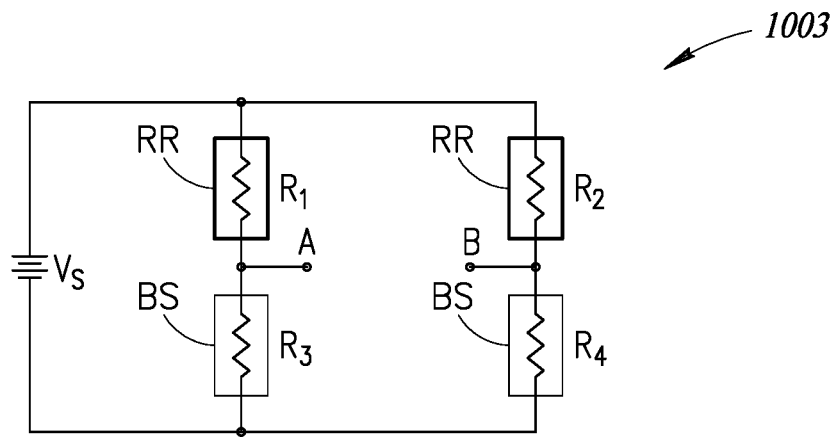
FIG. 10C is a view showing the construction of a fifth embodiment of the bridge circuit of the flexible display device having the bending sensing device according to the second embodiment of the present disclosure.
Figure 10D:
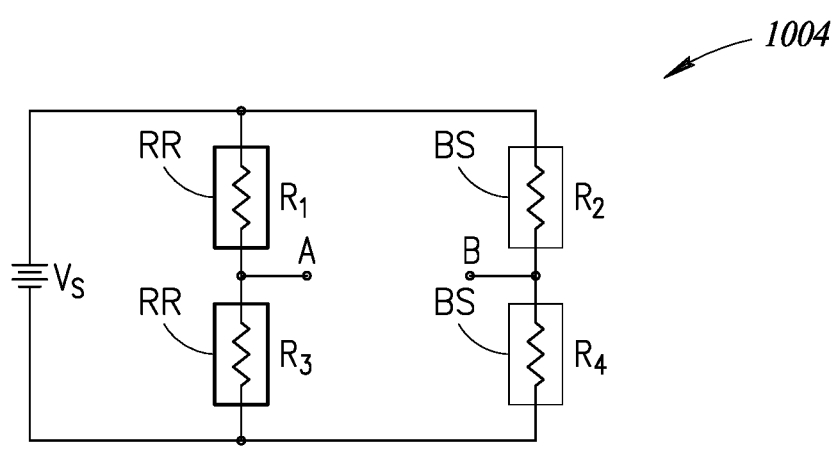
FIG. 10D is a view showing the construction of a sixth embodiment of the bridge circuit of the flexible display device having the bending sensing device according to the second embodiment of the present disclosure.

FIG. 10A is a view showing the construction of a third embodiment of a bridge circuit 1001 of the flexible display device 800 having the bending sensing device according to the second embodiment of the present disclosure, FIG. 10B is a view showing the construction of a fourth embodiment of a bridge circuit 1002 of the flexible display device 800 having the bending sensing device according to the second embodiment of the present disclosure, FIG. 10C is a view showing the construction of a fifth embodiment of a bridge circuit 1003 of the flexible display device 800 having the bending sensing device according to the second embodiment of the present disclosure, and FIG. 10D is a view showing the construction of a sixth embodiment of a bridge circuit 1004 of the flexible display device 800 having the bending sensing device according to the second embodiment of the present disclosure.

In the flexible display device 800 having the bending sensing device according to the second embodiment of the present disclosure, the third embodiment of the bridge circuit 1001 includes two bending sensors (strain gauges) R1 and R2 and two reference resistors R3 and R4, as shown in FIG. 10A. That is, one bending sensor (strain gauge) mounted in the third film U3, which is compressed, as described with reference to FIG. 8, corresponds to R2 shown in FIG. 10A, and the other bending sensor (strain gauge) mounted in the second film U2, which is tensioned, corresponds to R1 shown in FIG. 10A.

That is, a bridge circuit 1001 including a first connection unit, in which R1 and R3 are coupled to each other in series via a first load, and a second connection unit, in which R2 and R4 are coupled to each other in series via a second load, disposed between opposite ends of a power source (Vs), wherein the first connection unit and the second connection unit are coupled to each other in parallel, and output terminals A and B are formed at the first load and the second load, respectively, is characterized in that one bending sensor (strain gauge) mounted in the second film U2, which is tensioned, is constituted by R1, and the other bending sensor (strain gauge) mounted in the third film U3, which is compressed, is constituted by R2. In addition, the reference resistors mounted in the non-bending regions of the third film U3, which is compressed, and the second film U2, which is tensioned, are constituted by R3 and R4, respectively.

In the case in which the bridge circuit 1001 is configured as shown in FIG. 10A, the voltage value $V_{AB}$ between the terminals A and B is as represented in [Equation 1].

$$V_{AB}=[R3/(R1+R3)-R4/(R2+R4)] \times Vs$$

R1 is a bending sensor for sensing tensile strain, and therefore the resistance of R1 is increased. R2 is a bending sensor for sensing compressive strain, and therefore the resistance of R2 is decreased. Consequently, the output voltage of the bridge circuit 1001 according to the present disclosure is equivalent to twice that of the conventional bridge circuit shown in FIG. 3A.

In addition, since the bending sensors R1 and R2 and the reference resistors R3 and R4 are mounted in the flexible display device 800, the bending sensors R1 and R2 and the reference resistors R3 and R4 may have the same tolerance range. Furthermore, output offset voltage values may be lowered, and resistance deviation depending on temperature change may be reduced.

In the bridge circuit 1001 of FIG. 10A, one bending sensor (strain gauge) mounted in the third film U3, which is compressed, may be constituted by R1, and the other bending sensor (strain gauge) mounted in the second film U2, which is tensioned, may be constituted by R2.

Meanwhile, in the flexible display 800 device having the bending sensing device according to the second embodiment of the present disclosure, the fourth embodiment 1002 of the bridge circuit includes two bending sensors (strain gauges) R1 and R3 and two reference resistors R2 and R4, as shown in FIG. 10B. That is, one bending sensor (strain gauge) mounted in the third film U3, which is compressed, as described with reference to FIG. 8, corresponds to R1 shown in FIG. 10B, and the other bending sensor (strain gauge) mounted in the second film U2, which is tensioned, corresponds to R3 shown in FIG. 10B.

That is, a bridge circuit 1002 including a first connection unit, in which R1 and R3 are coupled to each other in series via a first load, and a second connection unit, in which R2 and R4 are coupled to each other in series via a second load, disposed between opposite ends of a power source (Vs), wherein the first connection unit and the second connection unit are coupled to each other in parallel, and output terminals A and B are formed at the first load and the second load, respectively, is characterized in that one bending sensor (strain gauge) mounted in the third film U3, which is compressed, is constituted by R1, and the other bending sensor (strain gauge) mounted in the second film U2, which is tensioned, is constituted by R3. In addition, the reference resistors mounted in the non-bending regions of the third film U3, which is compressed, and the second film U2, which is tensioned, are constituted by R2 and R4, respectively.

In the case in which the bridge circuit 1002 is configured as shown in FIG. 10B, the voltage value $V_{AB}$ between the terminals A and B is as represented in [Equation 1]. R3 is a bending sensor for sensing tensile strain, and therefore the resistance of R3 is increased. R1 is a bending sensor for sensing compressive strain, and therefore the resistance of R1 is decreased. Consequently, the output voltage of the bridge circuit 1002 according to the present disclosure is equivalent to twice that of the conventional bridge circuit shown in FIG. 3A.

In addition, since the bending sensors R1 and R3 and the reference resistors R2 and R4 are mounted in the flexible display device 800, the bending sensors R1 and R3 and the reference resistors R2 and R4 may have the same tolerance range. Furthermore, output offset voltage values may be lowered, and resistance deviation depending on temperature change may be reduced.

In the bridge circuit 1002 of FIG. 10B, one bending sensor (strain gauge) mounted in the third film U3, which is compressed, may be constituted by R3, and the other bending sensor (strain gauge) mounted in the second film U2, which is tensioned, may be constituted by R1.

Meanwhile, in the flexible display device 800 having the bending sensing device according to the second embodiment of the present disclosure, the fifth embodiment of the bridge circuit 1003 includes two bending sensors (strain gauges) R3 and R4 and two reference resistors R1 and R2, as shown in FIG. 10C. That is, one bending sensor (strain gauge) mounted in the third film U3, which is compressed, as described with reference to FIG. 8, corresponds to R3 shown in FIG. 10C, and the other bending sensor (strain gauge) mounted in the second film U2, which is tensioned, corresponds to R4 shown in FIG. 10C.

That is, a bridge circuit 1003 including a first connection unit, in which R1 and R3 are coupled to each other in series via a first load, and a second connection unit, in which R2 and R4 are coupled to each other in series via a second load, disposed between opposite ends of a power source (Vs), wherein the first connection unit and the second connection unit are coupled to each other in parallel, and output terminals A and B are formed at the first load and the second load, respectively, is characterized in that one bending sensor (strain gauge) mounted in the third film U3, which is compressed, is constituted by R3, and the other bending sensor (strain gauge) mounted in the second film U2, which is tensioned, is constituted by R4. In addition, the reference resistors mounted in the non-bending regions of the third film U3, which is compressed, and the second film U2, which is tensioned, are constituted by R1 and R2, respectively.

In the case in which the bridge circuit 1003 is configured as shown in FIG. 10C, the voltage value $V_{AB}$ between the terminals A and B is as represented in [Equation 1]. R3 is a bending sensor for sensing compressive strain, and therefore the resistance of R3 is decreased. R4 is a bending sensor for sensing tensile strain, and therefore the resistance of R4 is increased. Consequently, the output voltage of the bridge circuit 1003 according to the present disclosure is equivalent to twice that of the conventional bridge circuit shown in FIG. 3A.

In addition, since the bending sensors R3 and R4 and the reference resistors R1 and R2 are mounted in the flexible display device 800, the bending sensors R3 and R4 and the reference resistors R1 and R2 may have the same tolerance range. Furthermore, output offset voltage values may be lowered, and resistance deviation depending on temperature change may be reduced.

In the bridge circuit 1003 of FIG. 10C, one bending sensor (strain gauge) mounted in the third film U3, which is compressed, may be constituted by R4, and the other bending sensor (strain gauge) mounted in the second film U2, which is tensioned, may be constituted by R3.

Meanwhile, in the flexible display device 800 having the bending sensing device according to the second embodiment of the present disclosure, the sixth embodiment of the bridge circuit 1004 includes two bending sensors (strain gauges) R2 and R4 and two reference resistors R1 and R3, as shown in FIG. 10D. That is, one bending sensor (strain gauge) mounted in the third film U3, which is compressed, as described with reference to FIG. 8, corresponds to R2 shown in FIG. 10D, and the other bending sensor (strain gauge) mounted in the second film U2, which is tensioned, corresponds to R4 shown in FIG. 10D.

That is, a bridge circuit 1004 including a first connection unit, in which R1 and R3 are coupled to each other in series via a first load, and a second connection unit, in which R2 and R4 are coupled to each other in series via a second load, disposed between opposite ends of a power source (Vs), wherein the first connection unit and the second connection unit are coupled to each other in parallel, and output terminals A and B are formed at the first load and the second load, respectively, is characterized in that one bending sensor (strain gauge) mounted in the third film U3, which is compressed, is constituted by R2, and the other bending sensor (strain gauge) mounted in the second film U2, which is tensioned, is constituted by R4. In addition, the reference resistors mounted in the non-bending regions of the third film U3, which is compressed, and the second film U2, which is tensioned, are constituted by R1 and R3, respectively.

In the case in which the bridge circuit 1004 is configured as shown in FIG. 10D, the voltage value $V_{AB}$ between the terminals A and B is as represented in [Equation 1]. R2 is a bending sensor for sensing compressive strain, and therefore the resistance of R2 is decreased. R4 is a bending sensor for sensing tensile strain, and therefore the resistance of R4 is increased. Consequently, the output voltage of the bridge circuit 1004 according to the present disclosure is equivalent to twice that of the conventional bridge circuit shown in FIG. 3A.

In addition, since the bending sensors R2 and R4 and the reference resistors R1 and R3 are mounted in the flexible display device 800, the bending sensors R2 and R4 and the reference resistors R1 and R3 may have the same tolerance range. Furthermore, output offset voltage values may be lowered, and resistance deviation depending on temperature change may be reduced.

In the bridge circuit 1004 of FIG. 10D, one bending sensor (strain gauge) mounted in the third film U3, which is compressed, may be constituted by R4, and the other bending sensor (strain gauge) mounted in the second film U2, which is tensioned, may be constituted by R2.

[Flexible Display Device Having Bending Sensing Device According to Third Embodiment]

Figure 11A:
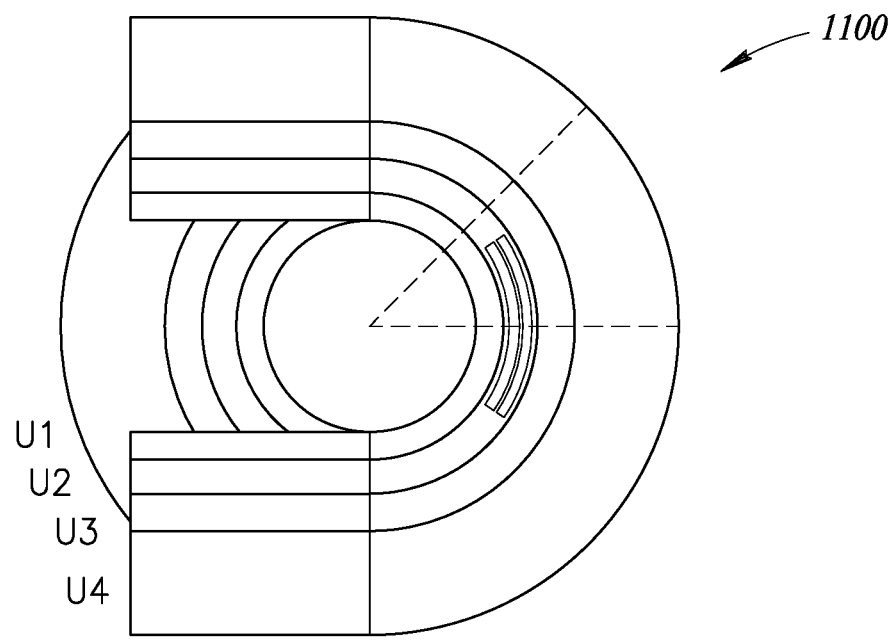
FIG. 11A is a view illustrating a flexible display device having a bending sensing device according to a third embodiment of the present disclosure.
Figure 11B:
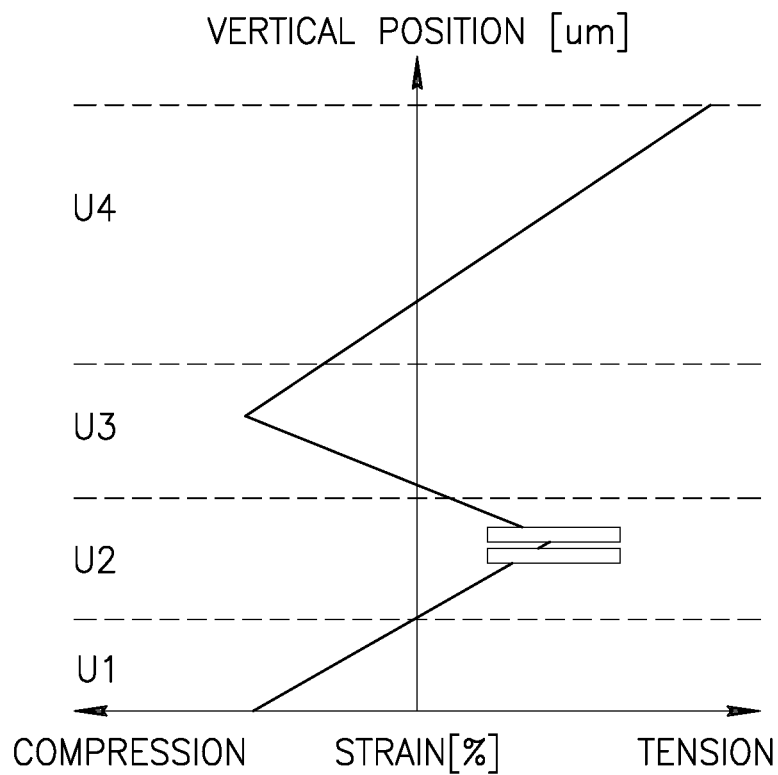
FIG. 11B is a plot illustrating the relationship between tension and compression in the layers of the flexible display device of FIG. 11A.
Figure 12A:
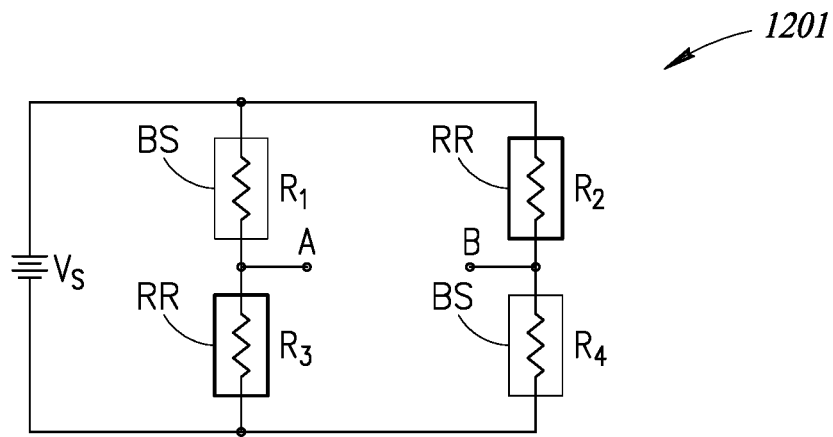
FIG. 12A is a view showing the construction of a seventh embodiment of a bridge circuit of the flexible display device having the bending sensing device according to the third embodiment of the present disclosure.
Figure 12B:
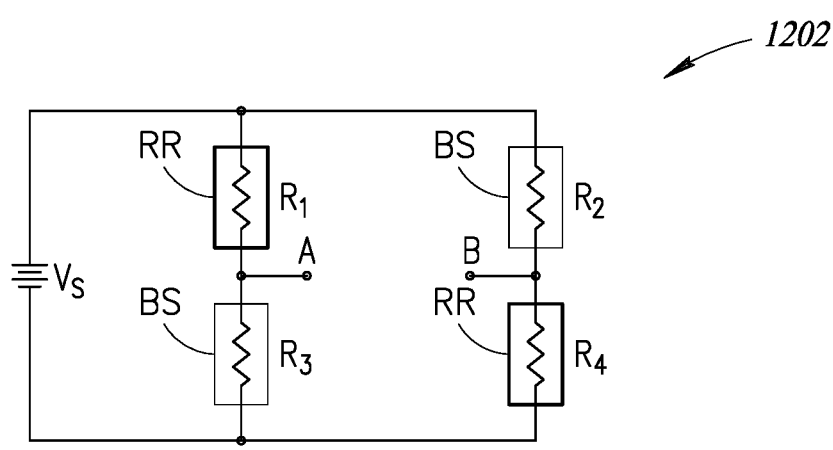
FIG. 12B is a view showing the construction of an eighth embodiment of the bridge circuit of the flexible display device having the bending sensing device according to the third embodiment of the present disclosure.

FIGS. 11A and 11B illustrate a flexible display device 1100 having a bending sensing device according to a third embodiment of the present disclosure, FIG. 12A is a view showing the construction of a seventh embodiment of a bridge circuit 1201 of the flexible display device 1100 having the bending sensing device according to the third embodiment of the present disclosure, and FIG. 12B is a view showing the construction of an eighth embodiment of a bridge circuit 1202 of the flexible display device 1100 having the bending sensing device according to the third embodiment of the present disclosure.

In the flexible display device 1100 having the bending sensing device according to the third embodiment of the present disclosure, as shown in FIG. 11, two bending sensors are mounted in the bending region of the third film U3, which is compressed, and two reference resistors are mounted in the non-bending region of the third film U3, which is compressed. Alternatively, two bending sensors may be mounted in the bending region of the second film U2, which is tensioned, and two reference resistors may be mounted in the non-bending region of the second film U2, which is tensioned.

FIG. 11 shows the case in which two bending sensors are mounted in the bending region of the second film U2, which is tensioned. Although not shown in FIG. 11, the two bending sensors may be mounted in the bending region of the third film U3, which is compressed.

In the flexible display device 1100 having the bending sensing device according to the third embodiment of the present disclosure, the seventh embodiment of the bridge circuit 1201 includes two bending sensors (strain gauges) R1 and R4 and two reference resistors R2 and R3, as shown in FIG. 12A.

Two bending sensors (strain gauges) mounted in the bending region of the second film U2, which is tensioned, as described with reference to FIG. 11, or two bending sensors (strain gauges) mounted in the bending region of the third film U3, which is compressed, as described with reference to FIG. 11, correspond to R1 and R4 shown in FIG. 12A, and two reference resistors mounted in the non-bending region of the second film U2, which is tensioned, or two reference resistors mounted in the non-bending region of the third film U3, which is compressed, correspond to R2 and R3 shown in FIG. 12A.

That is, a bridge circuit 1201 including a first connection unit, in which R1 and R3 are coupled to each other in series via a first load, and a second connection unit, in which R2 and R4 are coupled to each other in series via a second load, disposed between opposite ends of a power source (Vs), wherein the first connection unit and the second connection unit are coupled to each other in parallel, and output terminals A and B are formed at the first load and the second load, respectively, is characterized in that two bending sensors (strain gauges) mounted in the bending region of the third film U3, which is compressed, or two bending sensors (strain gauges) mounted in the bending region of the second film U2, which is tensioned, are constituted by R1 and R4.

Figure 1:
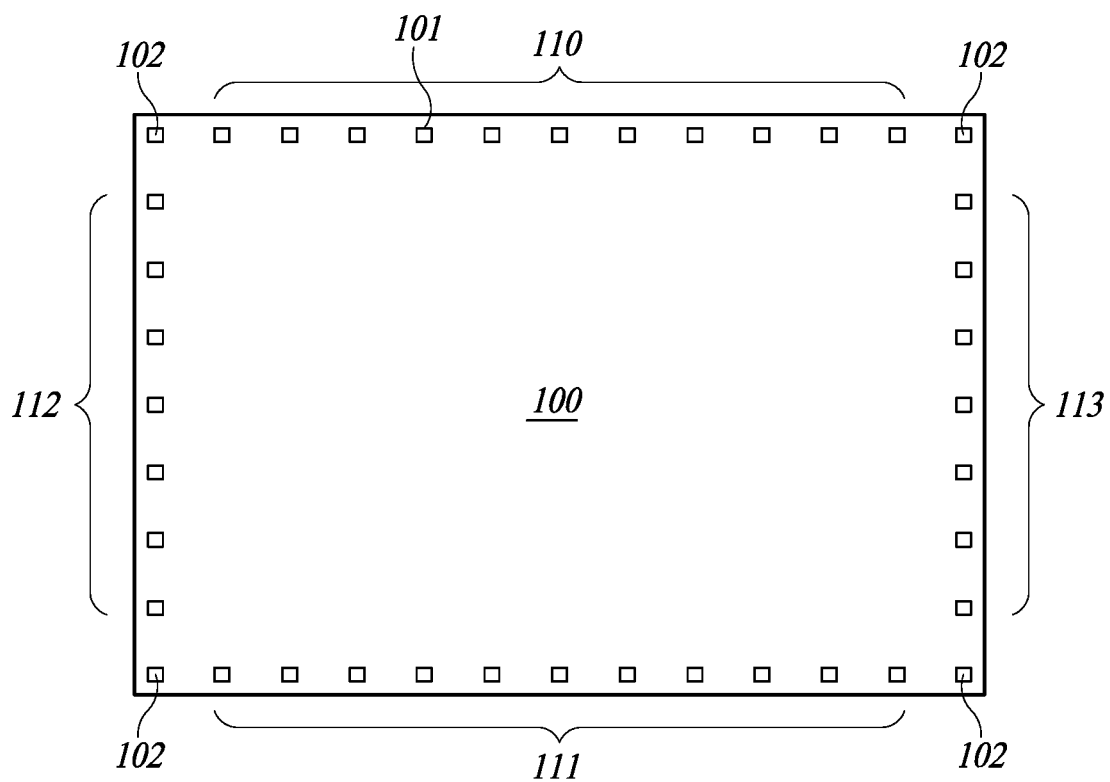
FIG. 1 is a view showing a conventional flexible display device in which a plurality of bending sensors is disposed.
Figure 2:
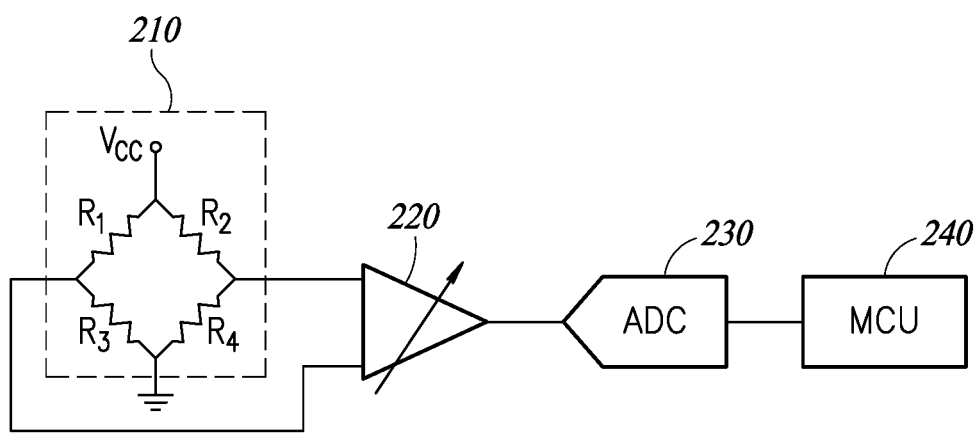
FIG. 2 is a view showing the construction of a conventional measurement unit.
Figure 3A:
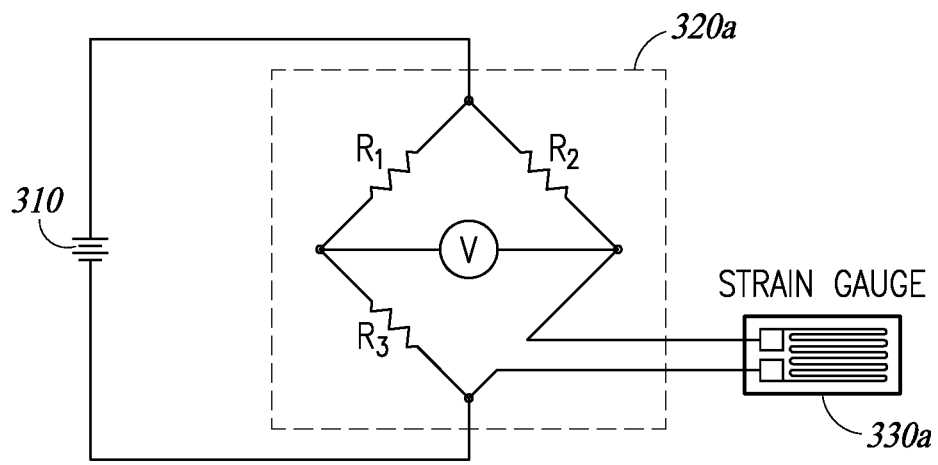
Figure 3B:
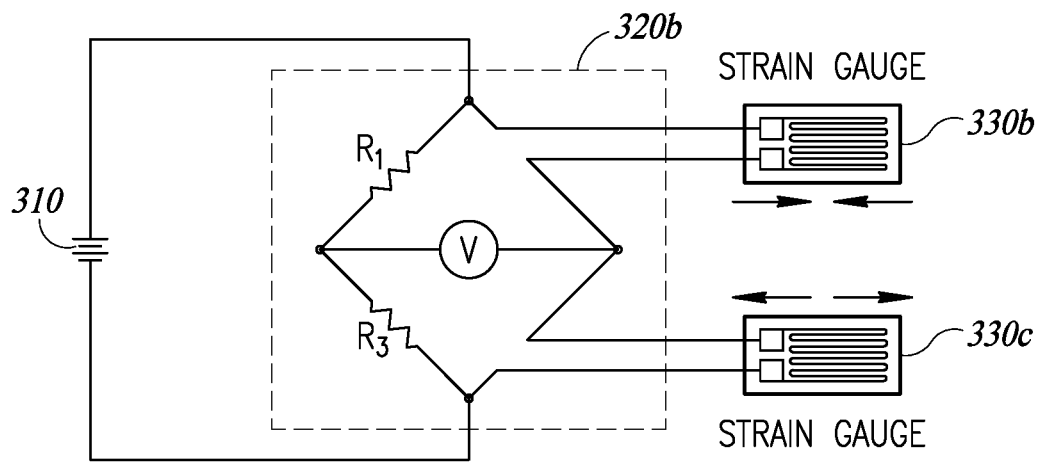
Figure 4:
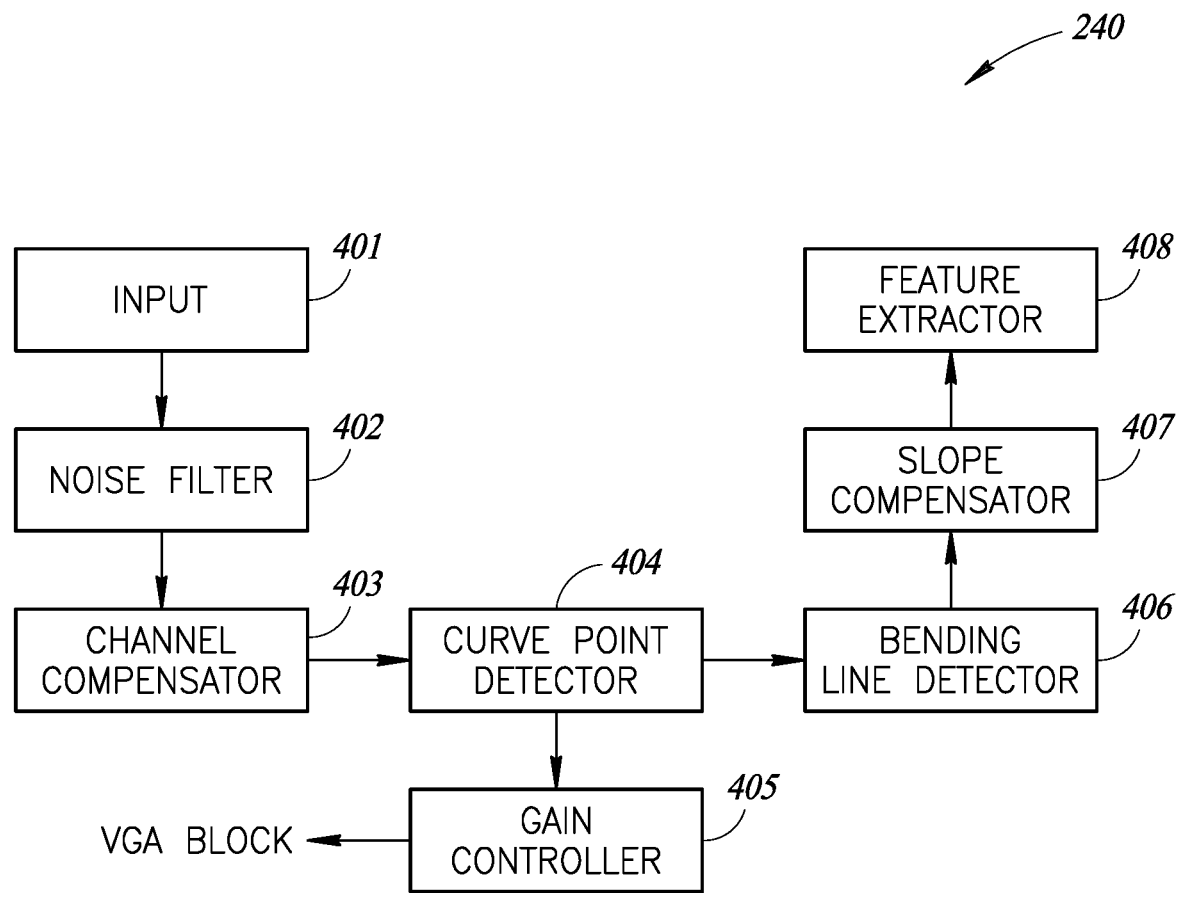
FIG. 4 is a block diagram showing the detailed construction of a microprocessor (MCU) of FIG. 2.

In the case in which the bridge circuit 1201 is configured as shown in FIG. 12A, the output voltage of the bridge circuit 1201 according to the present disclosure is equivalent to twice that of the conventional bridge circuit shown in FIG. 3A, as previously described. In addition, the bending sensors and the reference resistors may have the same tolerance range. Furthermore, output offset voltage values may be lowered, and resistance deviation depending on temperature change may be reduced.

Meanwhile, in the flexible display device 1100 having the bending sensing device according to the third embodiment of the present disclosure, the eighth embodiment of the bridge circuit 1202 includes two bending sensors (strain gauges) R2 and R3 and two reference resistors R1 and R4, as shown in FIG. 12B.

The two bending sensors (strain gauges) mounted in the bending region of the second film U2, which is tensioned, as described with reference to FIG. 11, or the two bending sensors (strain gauges) mounted in the bending region of the third film U3, which is compressed, correspond to R2 and R3 shown in FIG. 12B, and the two reference resistors mounted in the non-bending region of the second film U2, which is tensioned, or the two reference resistors mounted in the non-bending region of the third film U3, which is compressed, correspond to R1 and R4 shown in FIG. 12B.

That is, a bridge circuit 1202 including a first connection unit, in which R1 and R3 are coupled to each other in series via a first load, and a second connection unit, in which R2 and R4 are coupled to each other in series via a second load, disposed between opposite ends of a power source (Vs), wherein the first connection unit and the second connection unit are coupled to each other in parallel, and output terminals A and B are formed at the first load and the second load, respectively, is characterized in that two bending sensors (strain gauges) mounted in the bending region of the third film U3, which is compressed, or two bending sensors (strain gauges) mounted in the bending region of the second film U2, which is tensioned, are constituted by R2 and R3.

In the case in which the bridge circuit 1202 is configured as shown in FIG. 12B, the output voltage of the bridge circuit according to the present disclosure is equivalent to twice that of the conventional bridge circuit shown in FIG. 3A, as previously described. In addition, the bending sensors and the reference resistors may have the same tolerance range. Furthermore, output offset voltage values may be lowered, and resistance deviation depending on temperature change may be reduced.

In each of the embodiments of the present disclosure described above, a bending sensor and a routing line for outputting a signal detected by the bending sensor may be formed of a conductive material used in a process of forming a film (layer), in which the bending sensor will be mounted.

For example, assuming that a film (layer) that is compressed is a pixel array layer (TFT+Encap) and a film (layer) that is tensioned is a touch sensor layer (Touch), a bending sensor and a routing line may be formed of a material used to form a gate electrode, a data electrode, a scan line, and a data line of a transistor constituting a pixel array, or a bending sensor and a routing line may be formed of a material used to form an X-axis electrode and a Y-axis electrode for sensing and the routing line.

The result of experiments according to the present disclosure shows that output voltage has an offset of −0.123 mV to 0.135 mV in the case in which the reference resistor is provided in the board circuit as shown in FIG. 3A, whereas output voltage has an offset of −0.004 mV to 0.004 mV in the case in which the reference resistor is mounted in the flexible display device in accordance with the present disclosure. Consequently, it can be seen that the offset of the output voltage according to the present disclosure is about 97% less than that of the output voltage according to the conventional art.

In the case in which the bending sensor shown in FIG. 7A is mounted in the bending region of the flexible display device having the bending sensing device according to each embodiment of the present disclosure described above, however, the bending angle may not be accurately measured if the bending region is not bent but is twisted.

[Flexible Display Device Having Bending Sensing Device According to Fourth Embodiment]

FIGS. 13A and 13B are views illustrating the case in which the bending region is normally bent at 90 degrees, wherein FIG. 13A is a view illustrating the flexible display device having the bending sensing device according to the second or third embodiment of the present disclosure, and FIG. 13B is a view showing the state of a bending sensor when the bending sensor is mounted in a point at which tensile strain is generated and a bending region is not bent and the state of the bending sensor when the bending sensor is mounted in the point at which tensile strain is generated and the bending region is normally bent.

That is, as described in the bending sensing device according to the second or third embodiment of the present disclosure, two bending sensors (strain gauges) may be mounted in a bending region of one side of the flexible display device such that the bending sensors are perpendicular to the flexible display device (e.g., perpendicular with respect to the length axis of the bending region), and two reference resistors may be mounted in a non-bending region of one side of the flexible display device. Alternatively, one bending sensor (strain gauge) may be mounted in a bending region of each side of the flexible display device such that the bending sensor is perpendicular to the flexible display device, and one reference resistor may be mounted in a non-bending region of each side of the flexible display device.

In FIG. 13A, the two bending sensors (strain gauges) are denoted by R1 and R3, and the two reference resistors are denoted by R2 and R4.

When the bending region of the flexible display device is not bent (shown at 1301), the bending sensor R1 or R3 has a length L, a width W, and a thickness t shown in FIG. 13B. When the bending region of the flexible display device is bent (shown at 1302), the bending sensor R1 or R3 has a length L', a width W', and a thickness t', as shown in FIG. 13B. That is, when the bending sensor is mounted in the point at which tensile strain is generated and the bending region of the flexible display device is bent, as previously described, the length L of the bending sensor R1 or R3 is increased (L→L'), and the width and the thickness of the bending sensor R1 or R3 are decreased (W→W' and t→t'), whereby the resistance is increased.

When the bending region is bent, as described above, the length L', the width W', and the thickness t' of the bending sensor R1 or R3 are expressed as follows using the characteristics described with reference to FIG. 5.

$$L'=Lx(1+\varepsilon)$$

$$W'=Wx(1-\nu x\varepsilon), \nu=0.334$$

$$t'=tx(1-\nu x\varepsilon)$$

$$R'=\rho xL'/(W'xt') \qquad \text{[Equation 2]}$$

In Equation 2, strain ε and resistance variation (R−R')/R are calculated in consideration of the values of the length L and L', the width W and W', and the thickness t and t'.

In the case in which the strain ε is 1% (0.01) and the variation in resistance of each of the bending sensors R1 and R3 is 1.68% (0.0168), it is recognized that the bending region of the flexible display device is bent at about 90 degrees.

Even in the case in which the bending region of the flexible display device is not normally bent but is twisted, the strain and the resistance variation of each of the bending sensors R1 and R3 are changed.

FIGS. 14A and 14B are views illustrating the case in which the flexible display device is twisted, wherein FIG. 14A is a view illustrating the case in which the flexible display device having the bending sensing device according to the second or third embodiment of the present disclosure is twisted, and FIG. 14B is a view showing the state of a bending sensor when the bending sensor is mounted in a point at which tensile strain is generated and a bending region is not bent (shown at 1401) and the state of the bending sensor when the bending sensor is mounted in the point at which tensile strain is generated and the bending region is twisted (shown at 1402).

That is, when the bending region of the flexible display device is twisted, as shown in FIG. 14A (at 1402), the length L of the bending sensor R1 or R3 is increased (L→L1), and the width and the thickness of the bending sensor R1 or R3 are decreased (W→W' and t→t'), as shown in FIG. 14B, whereby the resistance is increased.

When the bending region of the flexible display device is twisted, as described above, the strain and the resistance variation of each of the bending sensors R1 and R3 are calculated as represented by Equation 2. In the case in which the strain $\varepsilon$ is 0.5% (0.005) and the resistance variation of each of the bending sensors R1 and R3 is 0.84% (0.0084), it is recognized that the bending region of the flexible display device is bent at about 45 degrees.

When the bending region of the flexible display device is not normally bent but is twisted, as described above, it is not possible to determine whether the bending region of the flexible display device is normally bent or twisted.

In the case in which the bending sensors are obliquely mounted in the bending region of the flexible display device, therefore, it is possible to sense twisting of the bending region of the flexible display device.

FIGS. 15A and 15B are views illustrating the change in length and width of bending sensors according to a fourth embodiment of the present disclosure when the bending sensors are obliquely mounted in a bending region of a flexible display device (e.g., oblique with respect to the long axis of the bending region) and the bending region is normally bent, wherein FIG. 15A is a view illustrating the case in which the bending sensors are obliquely mounted in the bending region of the flexible display device, and FIG. 15B is a view showing the state of a bending sensor when the bending sensor is obliquely mounted in a bending region and the bending region is not bent (shown at 1501) and the state of the bending sensor when the bending sensor is obliquely mounted in the bending region and the bending region is not twisted but is normally bent (shown at 1502).

As shown in FIG. 15A, one bending sensor (strain gauge) is mounted in a bending region of each side of the flexible display device, and one reference resistor is mounted in a non-bending region of each side of the flexible display device. Alternatively, two bending sensors (strain gauges) may be mounted in a bending region of one side of the flexible display device, and two reference resistors may be mounted in a non-bending region of one side of the flexible display device.

The two bending sensors (strain gauges) are obliquely mounted in the bending region of the flexible display device, and the two reference resistors are perpendicularly mounted (e.g., perpendicular with respect to the long axis of the bending region) in the non-bending region of the flexible display device.

In addition, one of the bending sensors (strain gauges) may be mounted in the bending region of the flexible display device such that the bending sensor (strain gauge) is oblique to the left, and the other bending sensor (strain gauge) may be mounted in the bending region of the flexible display device such that the bending sensor (strain gauge) is oblique to the right. In FIG. 15A, the two bending sensors (strain gauges) are denoted by R1 and R3, and the two reference resistors are denoted by R2 and R4.

Consequently, it is possible to distinguish between normal bending and twisting of the flexible display device using the bending sensors obliquely mounted in the bending region of the flexible display device.

That is, when the bending region of the flexible display device is not bent, as shown in FIG. 15B (at 1501), the bending sensor R1 or R3 has a length L and a width W. Since the bending sensor is obliquely mounted in the bending region of the flexible display device, however, the bending sensor R1 or R3 has a length L1 $(=(L+W)/\sqrt{2})$ and a width W1 $(=(L+W)/\sqrt{2})$.

When the bending region of the flexible display device is bent (shown at 1502), the bending sensor R1 or R3 has a length L' and a width W'.

When the bending region is bent, as described above, the length L', the width W', and the thickness t' of the bending sensor R1 or R3 are expressed as follows using the characteristics described with reference to FIG. 5.

$$L' \approx \sqrt{[L1 x (1+\varepsilon) x 2/32 + W1 x (1-\nu x \varepsilon) x 2/32]}$$

$$W' \approx \sqrt{[L1 x (1+\varepsilon)/32 + W1 x (1-\nu x \varepsilon)/32]} \quad \text{[Equation 3]}$$

In Equation 3, on the assumption that L=4 and W=2, L' becomes 4.0134 (0.34% increased), W' becomes 2.0067 (0.34% increased), and the resistance variation (R−R')/R becomes 0.34%.

In the case in which the bending sensors are perpendicularly mounted, in the same manner as the reference resistors R2 and R4, the variation in resistance of the bending sensors is about 1.68%. However, in the case in which the bending sensors are obliquely mounted, it is possible for the bending sensors to sense the bending of the flexible display device even though the variation in resistance of the bending sensors is small.

Even in the case in which the bending sensors are obliquely mounted in the bending region of the flexible display device, therefore, it is possible for the bending sensors to sense the bending of the flexible display device even when the bending region of the flexible display device is not twisted but is normally bent.

FIGS. 16A and 16B are views illustrating the change in length and width of the bending sensors according to the fourth embodiment of the present disclosure when the bending sensors are obliquely mounted in the bending region of the flexible display device and the bending region is twisted, wherein FIG. 16A is a view illustrating the case in which the bending sensors are obliquely mounted in the bending region of the flexible display device, and FIG. 16B is a view showing the state of a first bending sensor R1 when the bending region is twisted in the direction in which the first bending sensor R1 is oblique (at 1601) and the state of a second bending sensor R3 when the bending region is twisted in the direction in which the first bending sensor R1 is oblique (at 1602).

As shown in FIG. 16A, one bending sensor (strain gauge) is mounted in a bending region of each side of the flexible display device, and one reference resistor is mounted in a non-bending region of each side of the flexible display device. Alternatively, two bending sensors (strain gauges) may be mounted in a bending region of one side of the flexible display device, and two reference resistors may be mounted in a non-bending region of one side of the flexible display device.

The two bending sensors (strain gauges) are obliquely mounted in the bending region of the flexible display device, and the two reference resistors are perpendicularly mounted in the non-bending region of the flexible display device.

One of the bending sensors (strain gauges), i.e. a first bending sensor R1, is mounted in the bending region of the flexible display device such that the bending sensor (strain gauge) is oblique to the right, and the other bending sensor (strain gauge), i.e. a second bending sensor R3, is mounted in the bending region of the flexible display device such that the bending sensor (strain gauge) is oblique to the left. In FIG. 16A, the two bending sensors (strain gauges) are denoted by R1 and R3, and the two reference resistors are denoted by R2 and R4.

Consequently, it is possible to distinguish between normal bending and twisting of the flexible display device using the bending sensors obliquely mounted in the bending region of the flexible display device.

That is, when the bending region is twisted in the direction in which the first bending sensor R1 is oblique, as shown in FIG. 16B, the first bending sensor R1 shows no resistance variation, but the resistance variation of the second bending sensor R3 is greater than that of the first bending sensor R1.

When the resistance variation of the second bending sensor R3 is greater than that of the first bending sensor R1, it may be determined that the flexible display device is twisted to the right (in the direction in which the first bending sensor R1 is oblique). In addition, it is also possible to sense the twisting angle of the flexible display device based on the difference between the resistance variation of the first bending sensor R1 and the resistance variation of the second bending sensor R3.

On the other hand, when the resistance variation of the first bending sensor R1 is greater than that of the second bending sensor R3, it may be determined that the flexible display device is twisted to the left (in the direction in which the second bending sensor R3 is oblique). In addition, it is also possible to sensing the twisting angle of the flexible display device based on the difference between the resistance variation of the first bending sensor R1 and the resistance variation of the second bending sensor R3.

In the fourth embodiment of the present disclosure, therefore, the first and second bending sensors R1 and R3 are mounted in the bending region of the flexible display device such that the first and second bending sensors are oblique in different directions, and the resistance variation of the first bending sensor R1 and the resistance variation of the second bending sensor R3 are measured. When the resistance variation of the first bending sensor R1 and the resistance variation of the second bending sensor R3 are almost the same, it is determined that the bending region of the flexible display device is normally bent. Consequently, the strain ε and variation in resistance of the two bending sensors R1 and R3 are calculated, and the bending angle of the flexible display device is measured based on the calculated values.

When the resistance variation of the first bending sensor R1 is greater than that of the second bending sensor R3, it is determined that the bending region of the flexible display device is twisted in the direction in which the second bending sensor R3 is oblique. On the other hand, when the resistance variation of the second bending sensor R3 is greater than that of the first bending sensor R1, it is determined that the bending region of the flexible display device is twisted in the direction in which the first bending sensor R1 is oblique. Consequently, the twisting angle of the flexible display device is also sensed based on the difference between the resistance variation of the first bending sensor R1 and the resistance variation of the second bending sensor R3.

In the flexible display device having the bending sensing device according to the fourth embodiment of the present disclosure described above, the bending sensors may be mounted in the bending region of the flexible display device in the same manner as in the bending sensing devices according to the first to third embodiments of the present disclosure except that the bending sensors are obliquely mounted in the bending region of the flexible display device.

FIG. 17 is a plan view showing bending sensors and reference resistors mounted in the flexible display device having the bending sensing device according to the second or third embodiment of the present disclosure, and FIG. 18 is a plan view showing bending sensors and reference resistors mounted in the flexible display device having the bending sensing device according to the fourth embodiment of the present disclosure.

In the second or third embodiment of the present disclosure, as shown in FIG. 17, the bending sensor R1 and R3 and the reference resistors R2 and R4 are mounted in the flexible display device such that the bending sensor R1 and R3 and the reference resistors R2 and R4 are parallel (or perpendicular) to the flexible display device. In the fourth embodiment of the present disclosure, as shown in FIG. 18, the bending sensor R1 and R3 are mounted in the flexible display device such that the bending sensor R1 and R3 are oblique to the flexible display device (such that the first bending sensor R1 is oblique to the right and the second bending sensor R3 is oblique to the left), and the reference resistors R2 and R4 are mounted in the flexible display device such that the reference resistors R2 and R4 are parallel (or perpendicular) to the flexible display device.

That is, the bending sensors R1 and R3 are mounted in the flexible display device such that the bending sensors R1 and R3 are oblique in opposite directions.

As is apparent from the above description, the flexible display device having the bending sensing device according to the present disclosure has the following effects.

First, a bending sensor and a reference resistor are mounted in the flexible display device. Consequently, the bending sensor and the reference resistor have the same tolerance range. Furthermore, output offset voltage value is lowered, and resistance deviation depending on temperature change is reduced.

Second, bending sensors are mounted in the film that is tensioned and in the film that is compressed such that a small resistance variation sensed by the bending sensors is converted into a large output voltage value, which is output. Consequently, a signal-to-noise ratio (SNR) is improved, the bending angle can be accurately measured, and application to UI/UX is easily achieved.

Third, since the bending sensor and the reference resistor are mounted in the flexible display device, which includes a plurality of films (layers), the bending sensor and a routing line for outputting a signal detected by the bending sensor may be formed of a conductive material used in a process of forming a film (layer), in which the bending sensor will be mounted. Consequently, no additional process is required, and manufacturing costs are reduced.

Fourth, the bending sensors are obliquely mounted in the bending region of the flexible display device. Consequently, it is possible to sense normal bending and twisting of the flexible display device and to distinguish therebetween.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A flexible display device, comprising:
   a pixel array layer including a scan line, a data line, and a transistor;
   a touch sensor layer on the pixel array layer, the touch sensor layer including a plurality of touch sensing electrodes;
   a cover plate layer on the touch sensor layer, the touch sensor layer disposed between the pixel array layer and the cover plate layer;
   at least one bending sensor embedded in a bending region of at least one of a first layer that is tensioned or a second layer that is compressed when the flexible display device is bent, the at least one bending sensor formed of a same material as at least one of the scan line, the data line, or an electrode of the transistor in the pixel array layer; and
   at least one reference resistor embedded in only a non-bending region of at least one of the first layer that is tensioned or the second layer that is compressed,
   wherein the first layer is one of the pixel array layer or the touch sensor layer, and the second layer is a different one of the pixel array layer or the touch sensor layer.

2. The flexible display device according to claim 1, wherein one bending sensor is embedded in the bending region of the second layer that is compressed, and one reference resistor is embedded in the non-bending region of the second layer that is compressed.

3. The flexible display device according to claim 2, further comprising:
   a bridge circuit including:
   a first branch, in which first and third resistive elements are coupled to each other in series, the first branch including a first output terminal positioned between the first and third resistive elements, and
   a second branch, in which second and fourth resistive elements are coupled to each other in series, the second branch including a second output terminal positioned between the second and fourth resistive elements, the first and second branches being coupled to a power source in parallel with respect to each other,
   wherein the one bending sensor is one of the first through fourth resistive elements, and the one reference resistor is another of the first through fourth resistive elements, the reference resistor being adjacent to the bending sensor.

4. The flexible display device according to claim 3, wherein
   the one bending sensor is the first resistive element, and the one reference resistor is one of the second and third resistive elements,
   the one bending sensor is the second resistive element, and the one reference resistor is one of the first and fourth resistive elements,
   the one bending sensor is the third resistive element, and the one reference resistor is one of the first and fourth resistive elements, or
   the one bending sensor is the fourth resistive element, and the one reference resistor is one of the second and third resistive elements.

5. The flexible display device according to claim 1, wherein one bending sensor is embedded in the bending region of the first layer that is tensioned, and one reference resistor is embedded in the non-bending region of the first layer that is tensioned.

6. The flexible display device according to claim 1, wherein
   a first bending sensor is embedded in the bending region of the second layer that is compressed, and a first reference resistor is embedded in the non-bending region of the second layer that is compressed, and
   a second bending sensor is embedded in the bending region of the first layer that is tensioned, and a second reference resistor is embedded in the non-bending region of the first layer that is tensioned.

7. The flexible display device according to claim 6, wherein the first and second bending sensors are embedded in one side of the bending region of the flexible display device.

8. The flexible display device according to claim 6, wherein the first and second bending sensors are embedded in opposite sides of the bending region of the flexible display device.

9. The flexible display device according to claim 6, further comprising:
   a bridge circuit including:
   a first branch, in which first and third resistive elements are coupled to each other in series, the first branch including a first output terminal positioned between the first and third resistive elements, and
   a second branch, in which second and fourth resistive elements are coupled to each other in series, the second branch including a second output terminal positioned between the second and fourth resistive elements, the first and second branches being coupled to a power source in parallel with respect to each other,
   wherein the first and second bending sensors and the first and second reference resistors are provided as the first through fourth resistive elements in the bridge circuit according to at least one of the following arrangements:
   the first and second bending sensors are the first and second resistive elements, respectively, and the first and second reference resistors are the third and fourth resistive elements, respectively,
   the first and second bending sensors are the first and third resistive elements, respectively, and the first and second reference resistors are the second and fourth resistive elements, respectively,
   the first and second bending sensors are the third and fourth resistive elements, respectively, and the first and second reference resistors are the first and second resistive elements, respectively, or
   the first and second bending sensors are the second and fourth resistive elements, respectively, and the first and second reference resistors are the first and third resistive elements, respectively.

10. The flexible display device according to claim 1, wherein the at least one bending sensor and the at least one reference resistor are positioned according to one of the following arrangements:
    two bending sensors are embedded in the bending region of the second layer that is compressed, and two reference resistors are embedded in the non-bending region of the second layer that is compressed, or
    two bending sensors are embedded in the bending region of the first layer that is tensioned, and two reference resistors are embedded in the non-bending region of the first layer that is tensioned.

11. The flexible display device according to claim 10, further comprising:
a bridge circuit including:
a first branch, in which first and third resistive elements are coupled to each other in series, the first branch including a first output terminal positioned between the first and third resistive elements, and
a second branch, in which second and fourth resistive elements are coupled to each other in series, the second branch including a second output terminal positioned between the second and fourth resistive elements, the first and second branches being coupled to a power source in parallel with respect to each other,
wherein the two bending sensors and the two reference resistors are provided as the first through fourth resistive elements in the bridge circuit according to at least one of the following arrangements:
the two bending sensors are the first and fourth resistive elements, and the two reference resistors are the second and third resistive elements, or
the two bending sensors are the second and third resistive elements, and the two reference resistors are the first and fourth resistive elements.

12. The flexible display device according to claim 1, wherein the bending region has a bending axis extending between opposite first and second sides of the flexible display device, the at least one bending sensor is disposed adjacent to the first side of the display device, and the at least one reference resistor is disposed adjacent to the first side of the flexible display device and is spaced apart from the at least one bending sensor along a direction transverse to the bending axis.

13. A flexible display device, comprising:
a pixel array layer including a scan line, a data line, and a transistor;
a touch sensor layer on the pixel array layer, the touch sensor layer including a plurality of touch sensing electrodes;
a cover plate layer on the touch sensor layer, the touch sensor layer disposed between the pixel array layer and the cover plate layer;
at least one bending sensor embedded in only a bending region of the flexible display device such that the at least one bending sensor is oblique with respect to a long axis of the bending region in an unbent state of the flexible display device, the at least one bending sensor having an electrical resistance that varies based on an extent of bending of the flexible display device in the bending region, the at least one bending sensor formed of a same material as at least one of the scan line, the data line, or an electrode of the transistor in the pixel array layer; and
at least one reference resistor embedded in only a non-bending region of the flexible display device and spaced laterally apart from the at least one bending sensor along a direction perpendicular to the long axis of the bending region, such that the at least one reference resistor is parallel or perpendicular to the long axis of the bending region in the unbent state of the flexible display device, the at least one reference resistor having an electrical resistance that is the same when the flexible display device is bent and when the flexible display device is unbent.

14. The flexible display device according to claim 13, wherein
the at least one bending sensor comprises a first bending sensor and a second bending sensor, the first bending sensor and the second bending sensor being embedded in one side of the bending region, and
the at least one reference resistor comprises a first reference resistor and a second reference resistor, the first reference resistor and the second reference resistor being embedded in one side of the non-bending region.

15. The flexible display device according to claim 14, wherein the first bending sensor and the second bending sensor are embedded in the bending region such that the first bending sensor and the second bending sensor are oblique in opposite directions.

16. The flexible display device according to claim 13, wherein
the at least one bending sensor comprises a first bending sensor and a second bending sensor, the first bending sensor being embedded in one side of the bending region and the second bending sensor being embedded in the other side of the bending region, and
the at least one reference resistor comprises a first reference resistor and a second reference resistor, the first reference resistor being embedded in one side of the non-bending region and the second reference resistor being embedded in the other side of the non-bending region.

17. The flexible display device according to claim 16, wherein the first bending sensor and the second bending sensor are embedded in the bending region such that the first bending sensor and the second bending sensor are oblique in opposite directions.

18. A flexible display device, comprising:
a pixel array layer including a scan line, a data line, and a transistor;
a touch sensor layer on the pixel array layer, the touch sensor layer including a plurality of touch sensing electrodes;
a cover plate layer on the touch sensor layer;
at least one bending sensor embedded in a bending region of at least one of a first layer that is tensioned or a second layer that is compressed when the flexible display device is bent, the at least one bending sensor formed of a same material as at least one of the scan line, the data line, or an electrode of the transistor in the pixel array layer; and
at least one reference resistor embedded in only a non-bending region of at least one of the first layer that is tensioned or the second layer that is compressed, the first layer being one of the pixel array layer or the touch sensor layer, the second layer being a different one of the pixel array layer or the touch sensor layer.

19. The flexible display device according to claim 18, wherein the bending region has a bending axis extending between opposite first and second sides of the flexible display device, the at least one bending sensor is disposed adjacent to the first side of the display device, and the at least one reference resistor is disposed adjacent to the first side of the flexible display device and is spaced apart from the at least one bending sensor along a direction transverse to the bending axis.

* * * * *